(12) United States Patent
Sabry et al.

(10) Patent No.: US 11,841,268 B2
(45) Date of Patent: Dec. 12, 2023

(54) COMPACT MATERIAL ANALYZER

(71) Applicant: Si-Ware Systems, Cairo (EG)

(72) Inventors: Yasser M. Sabry, Cairo (EG); Bassem A. Mortada, Cairo (EG); Khaled Hassan, Cairo (EG); Abdelrahman Ahmed Maher Mohamed Elsayed Salem, Cairo (EG); Diaa Khalil, Cairo (EG); Mohamed H. Al Haron, Cairo (EG); Mohammed Ahmed Elsheikh, Cairo (EG); Ahmed Shebl, Cairo (EG); Bassam Saadany, Cairo (EG); Mostafa Medhat, Cairo (EG); Botros George Iskander Shenouda, Cairo (EG)

(73) Assignee: SI-WARE SYSTEMS, Cairo (EG)

( * ) Notice: Subject to any disclaimer, the term of this patent is extended or adjusted under 35 U.S.C. 154(b) by 0 days.

(21) Appl. No.: 17/590,781

(22) Filed: Feb. 1, 2022

(65) Prior Publication Data
US 2022/0244101 A1  Aug. 4, 2022

Related U.S. Application Data

(60) Provisional application No. 63/144,843, filed on Feb. 2, 2021.

(51) Int. Cl.
*G01J 3/02* (2006.01)
*G02B 19/00* (2006.01)

(52) U.S. Cl.
CPC .......... *G01J 3/0256* (2013.01); *G01J 3/0216* (2013.01); *G02B 19/0019* (2013.01)

(58) Field of Classification Search
CPC .......... G01J 3/0256; G01J 3/0216; G01J 3/26; G01J 3/0205; G01J 3/0259; G02B 19/0019; G01N 2021/3595; G01N 21/00
See application file for complete search history.

(56) References Cited

U.S. PATENT DOCUMENTS

| 8,531,675 B2 | 9/2013 | Khalil et al. |
| 10,060,791 B2 | 8/2018 | Sabry et al. |

(Continued)

FOREIGN PATENT DOCUMENTS

WO  2017107174 A1  7/2014

OTHER PUBLICATIONS

PCT/US2022/014866, Written Opinion of the International Preliminary Examining Authority, dated Jan. 27, 2023, 6 pgs.

(Continued)

*Primary Examiner* — Tarifur R Chowdhury
*Assistant Examiner* — Carlos Perez-Guzman
(74) *Attorney, Agent, or Firm* — LOZA & LOZA, LLP; Holly L. Rudnick

(57) ABSTRACT

Aspects relate to a compact material analyzer including a light source, a detector, and a module including a first optical window on a first side of the module, a second optical window on a second side of the module opposite the first side, and a light modulator. The light source produces input light at a high power that is passed through the first optical window to the light modulator. The light modulator is configured to attenuate the input light, produce modulated light based on the input light, and direct the modulated light through the second optical window to the sample. The modulated light produced by the light modulator is at a lower power safe for the sample. The detector is configured to receive output light from the sample produced from interaction with the modulated light through the second optical window and to detect a spectrum of the output light.

33 Claims, 29 Drawing Sheets

(56) References Cited

U.S. PATENT DOCUMENTS

| | | | |
|---|---|---|---|
| 11,320,588 B1* | 5/2022 | Mazed | G16H 40/63 |
| 2006/0193356 A1 | 8/2006 | Osiander et al. | |
| 2009/0262346 A1 | 10/2009 | Egloff et al. | |
| 2011/0139990 A1 | 6/2011 | Xie et al. | |
| 2012/0236382 A1* | 9/2012 | Puegner | G01J 3/1804 |
| | | | 359/566 |
| 2013/0321816 A1* | 12/2013 | Dattner | G02B 6/29344 |
| | | | 356/451 |
| 2014/0098371 A1 | 4/2014 | Sabry et al. | |
| 2017/0100064 A1* | 4/2017 | Van Dorpe | A61B 5/1451 |
| 2017/0363469 A1 | 12/2017 | Sabry et al. | |
| 2018/0180829 A1* | 6/2018 | Gudeman | B81B 7/007 |
| 2019/0301939 A1* | 10/2019 | Medhat | G01J 3/02 |
| 2020/0182695 A1* | 6/2020 | Roentgen | G01J 3/2803 |
| 2021/0140881 A1* | 5/2021 | Hassell | G01N 21/45 |
| 2021/0164836 A1* | 6/2021 | Husnik | G01J 3/2803 |

OTHER PUBLICATIONS

Eltagoury, Yomma, M., et al., "Novel Fourier transform infrared spectrometer architecture based on cascaded Fabry-Perot interferometers", Proc. SPIE 9760, MOEMS and Miniaturized Systems XV, 97600L, Mar. 15, 2016, 7 pages.

Hamamatsu Photonics, "MEMS devices: Technology", Aug. 6, 2017, 8 pages, Retrieved from the Internet <URL:http://www.hamamatsu.com/us/en/community/optical_sensors/technology/mems_devices/index.html> [retrieved on Aug. 6, 2017].

Warashina, Yoshihisa, et al., "MEMS based miniature FT-IR engine with built-in photodetector", Proc. SPIE 8977, MOEMS and Miniaturized Systems XIII, 89770E, Mar. 7, 2014, 10 pages.

* cited by examiner

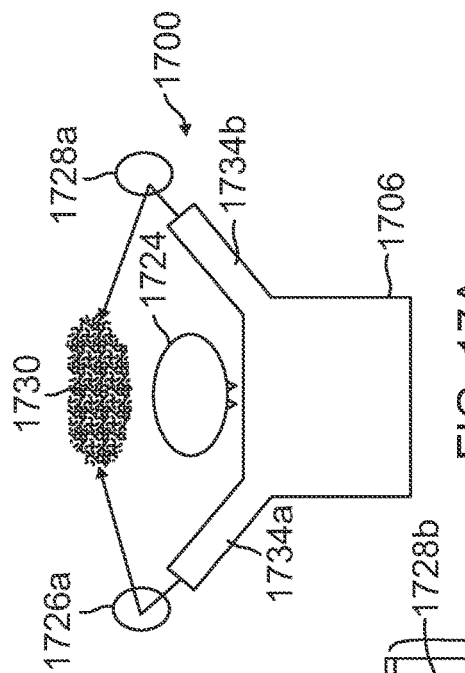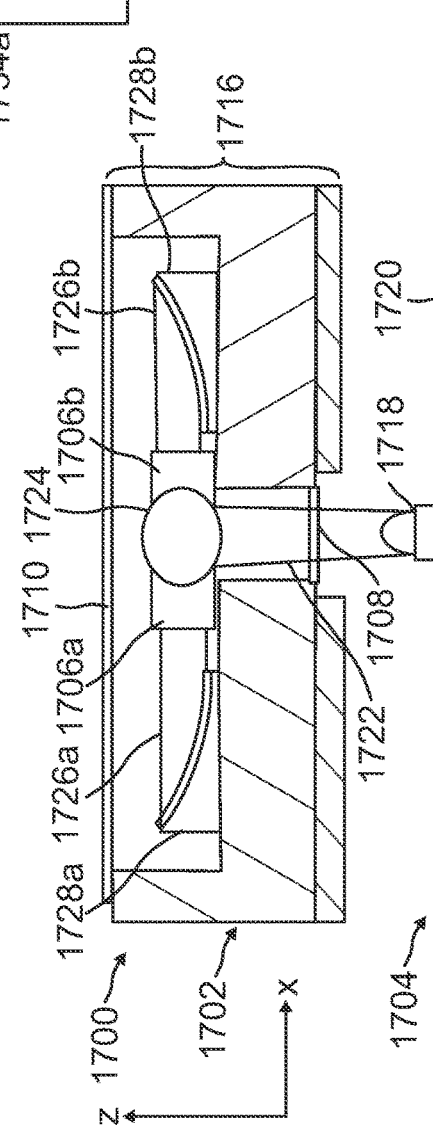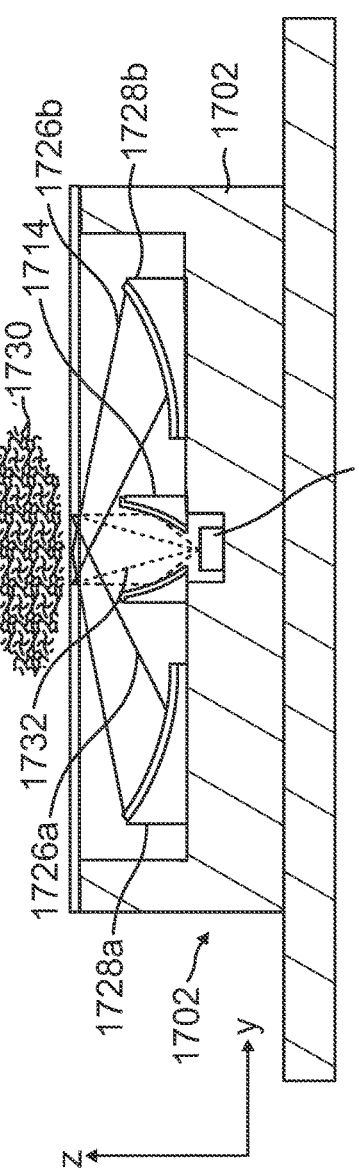

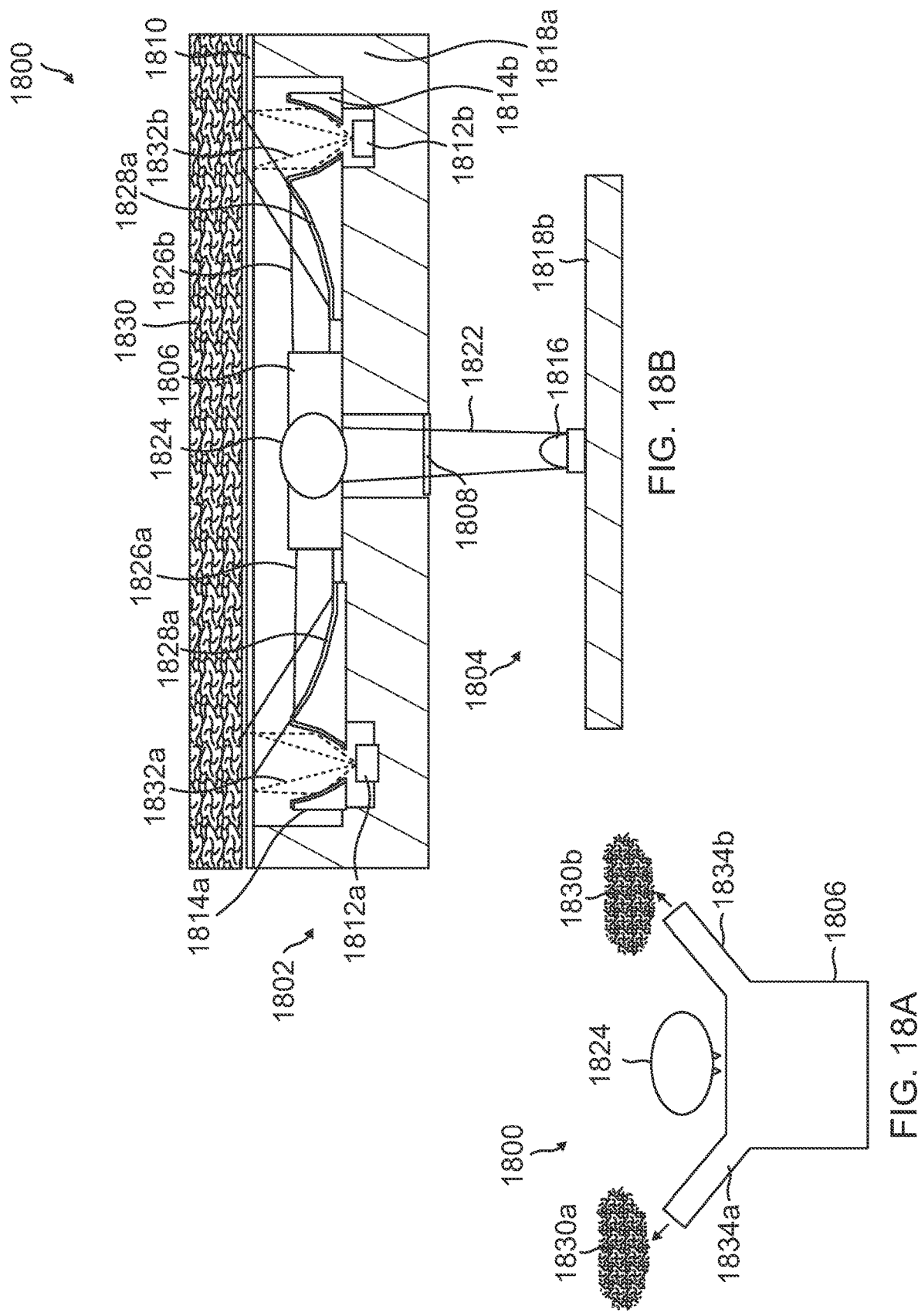

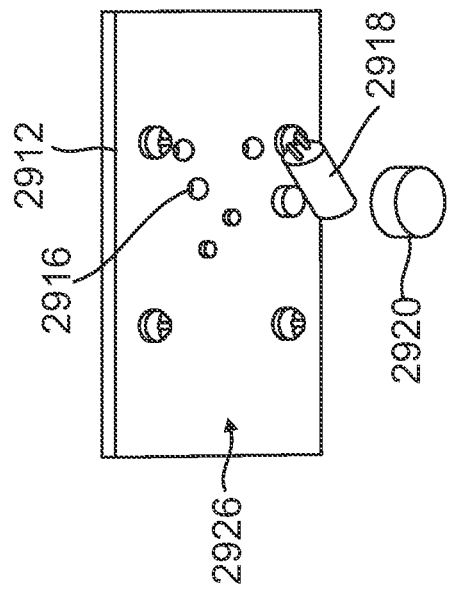
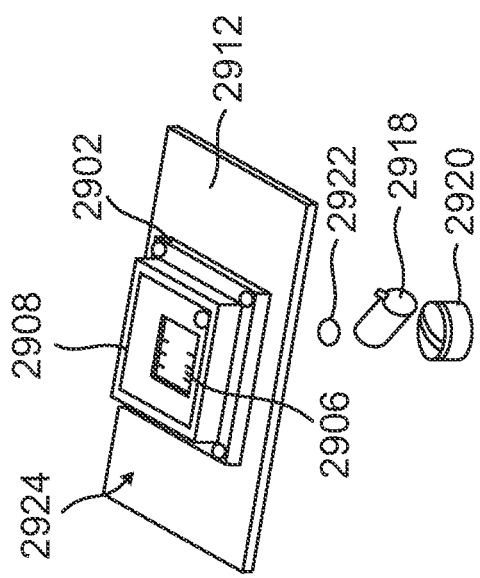
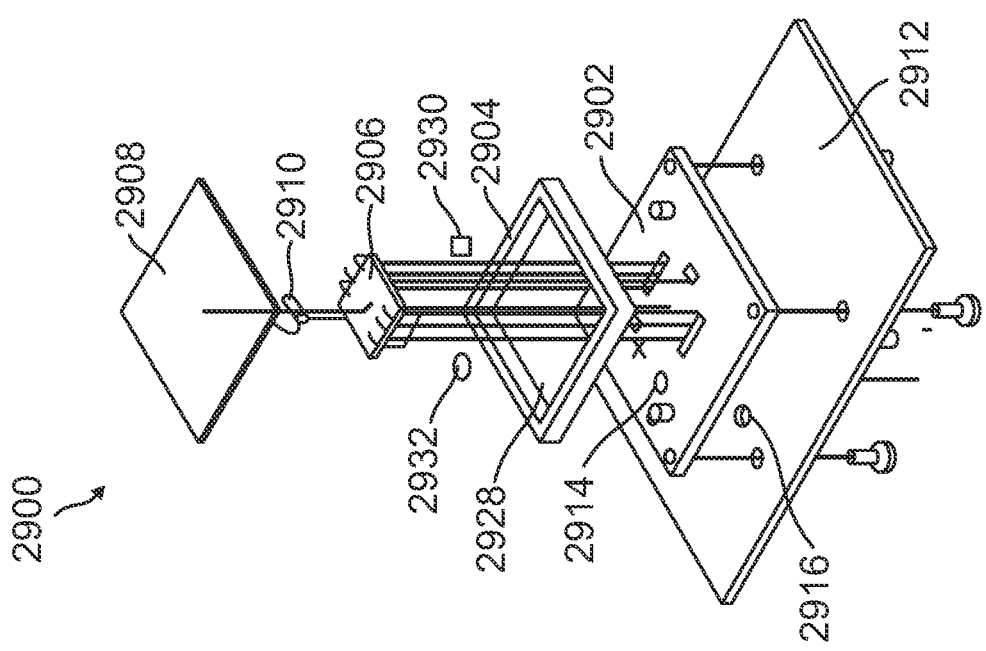

COMPACT MATERIAL ANALYZER

PRIORITY CLAIM

This application claims priority to and the benefit of Provisional Application No. 63/144,843, filed in the U.S. Patent and Trademark Office on Feb. 2, 2021, the entire content of which is incorporated herein by reference as if fully set forth below in its entirety and for all applicable purposes.

TECHNICAL FIELD

The technology discussed below relates generally to miniaturized integrated modulated light material analyzers, and in particular to mechanisms to avoid physical proximity between a light source and a sample under test.

BACKGROUND

Compact material analyzers, such as compact spectrometers, have been developed that enable modulated light to interact with a sample under test and the produced scattered light may then be analyzed. One example of a compact spectrometer includes a complementary metal-oxide semiconductor (CMOS) image sensor chip and a glass wiring board with a convex lens and reflective diffraction grating. Deep etching technology may be used to form an entrance slit on the CMOS sensor chip, while nanoimprinting technology may be used to form the reflective diffraction grating. Input light is guided into the slit, and then diffracted by the grating. The separated wavelengths then impinge on the CMOS linear image sensor array. Each pixel in the sensor can receive a particular wavelength of light. For example, the spectrometer can work in the wavelength range 340 nm-780 nm, limited by the use of the CMOS linear image sensor. A more compact version may be produced by replacing the glass lens with a grating chip. In both cases, extending this concept to the infrared (IR) range would be cost-prohibitive due to the need for an array of detectors. In addition, the sensor relies on light coming from the sample directly, and as a result, does not contain a light source.

Another example of a compact spectrometer working in the near-infrared (NIR) has been developed based on a micro-electro-mechanical systems (MEMS) Fabry-Perot interferometer. The Fabry-Perot interferometer can serve as a tunable filter. The filter is followed by an InGaAs PIN photodiode and a wiring board. The air gap in the interferometer can control the transmission response and allow certain wavelengths to pass. In this device, a single IR detector is used, but the wavelength range (e.g., 1550-1850 nm) is limited by the free-spectral range of the tunable filter and the multi-layer structure of the filter mirrors. There is also a tradeoff between the wavelength range and the spectral resolution. In addition, the light source is not part of the sensor as the spectrometer relies on receiving the light from the sample.

Other miniaturization efforts have also been performed. For example, the photodetector may be a MEMS-based IR detector, where the light incident on the IR absorber layer creates a temperature increase and causes a vertical displacement that can be sensed by means of a capacitive change. In addition, an integrated die level optical interferometer system including a thin layer of silicon in which electronic devices, the photodetector, the light source and a movable device are all fabricated has been developed.

Furthermore, an integrated device including a MEMS interferometer and a light redirecting structure has been developed. A light source can be integrated on the light redirecting structure and oriented to emit an input light beam directly towards a first mirror of the light redirecting structure to direct the light towards the MEMS interferometer. The output light beam from the MEMS interferometer can then be redirected by a second mirror of the light redirecting structure to a sample under test (SUT). The light transmitted and/or reflected from the SUT may then be optically coupled to the detector. However, the light source can cause heating of the SUT due to physical proximity and can cause heating of the light redirecting structure that is in physical proximity with the detector, thus raising the temperature of the detector.

SUMMARY

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In an example a compact material analyzer device is disclosed. The compact material analyzer device includes a light source configured to generate input light and a module including a first optical window on a first side of the module, a second optical window on a second side of the module opposite the first side, and a light modulator. The light modulator is configured to receive the input light from the light source through the first optical window, attenuate the input light, and produce modulated light based on the input light. The light modulator is further configured to direct the modulated light through the second optical window to a sample. The compact material analyzer device further includes a detector configured to receive output light from the sample produced from interaction with the modulated light through the second optical window and to detect a spectrum of the output light.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIGS. 17A and 17B are diagrams illustrating another example of a compact material analyzer device including multiple light modulation mechanisms according to some aspects.

FIGS. 18A and 18B are diagrams illustrating another example of a compact material analyzer device including a Mach Zehnder interferometer according to some aspects.

FIGS. 29A-29C are diagrams illustrating an example of an integrated material analyzer device using a metal substrate according to some aspects.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the disclosure relate to a compact material analyzer including a light source, a light modulator, and a detector. The light source produces electromagnetic radiation (e.g., input light) at a high power that is first passed through the light modulator prior to illuminating a sample under test to avoid damaging the sample. For example, the sample may be a biological sample, such as a skin sample, where the analysis is performed invitro or invivo. The modulated light produced by the light modulator is at a lower power that is safe to be impinged on the sample. The attenuation in power by the light modulator may be in the form of an absorption amount of the electromagnetic radiation, converting the electromagnetic radiation into heat energy that may be dissipated without harming the sample. The reduction in power may also be in the form of selection of certain wavelengths to be transmitted and directed to the sample. The reduction in power may further be in the form of diffraction losses or optical throughput (étendue) losses in the light modulator.

The modulated light interacts with the sample and the resulting output light may be detected by the detector and then analyzed. In some examples, the analysis may be based on a spectroscopic technique, such as direct absorption spectroscopy, indirect absorption spectroscopy (e.g., photo-acoustic spectroscopy), photo-thermal spectroscopy, or Raman spectroscopy. In some examples, the light modulator may include a spectrometer, such as a Michelson interferometer or a Fabry-Perot cavity, a diffraction grating, a spatial light modulator, or a birefringent device. In some examples, the light modulator may be implemented on a light modulation chip, such as an optical micro-electro-mechanical system (MEMS) device.

Figure 1:
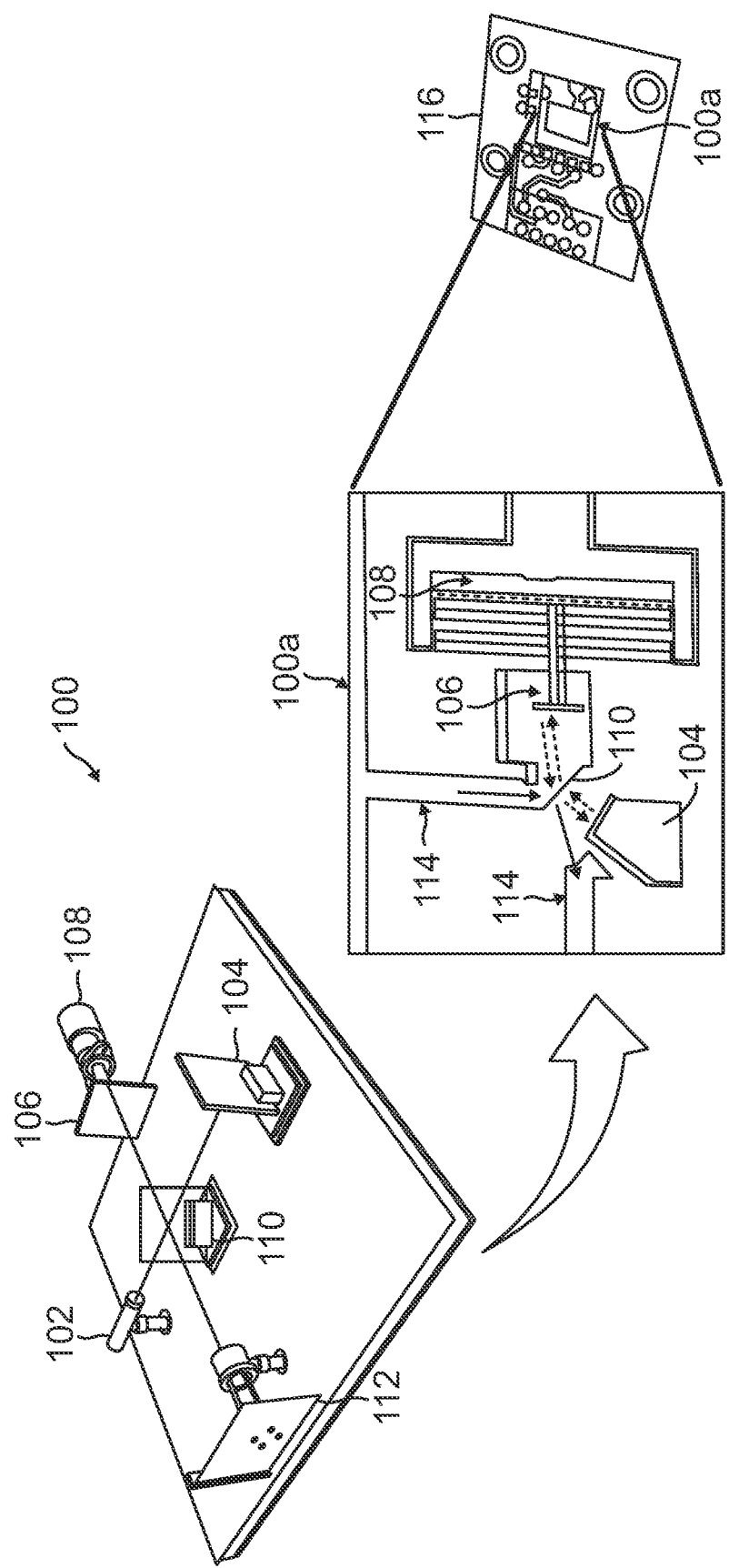
FIG. 1 is a diagram illustrating a spectrometer according to some aspects.

FIG. 1 is a diagram illustrating a spectrometer 100 according to some aspects. The spectrometer 100 may be, for example, a Fourier Transform infrared (FTIR) spectrometer. In the example shown in FIG. 1, the spectrometer 100 is a Michelson FTIR interferometer. In other examples, the spectrometer may include an FTIR Fabry-Perot interferometer.

FTIR spectrometers measure a single-beam spectrum (power spectral density (PSD)), where the intensity of the single-beam spectrum is proportional to the power of the radiation reaching the detector. In order to measure the absorbance of a sample, the background spectrum (i.e., the single-beam spectrum in absence of a sample) may first be measured to compensate for the instrument transfer function. The single-beam spectrum of light transmitted or reflected from the sample may then be measured. The absorbance of the sample may be calculated from the transmittance, reflectance, or trans-reflectance of the sample. For example, the absorbance of the sample may be calculated as the ratio of the spectrum of transmitted light, reflected light, or trans-reflected light from the sample to the background spectrum.

The interferometer 100 includes a fixed mirror 104, a moveable mirror 106, a beam splitter 110, and a detector 112 (e.g., a photodetector). A light source 102 associated with the spectrometer 100 is configured to emit an input beam and to direct the input beam towards the beam splitter 110. The light source 102 may include, for example, a laser source, one or more wideband thermal radiation sources, or a quantum source with an array of light emitting devices that cover the wavelength range of interest.

The beam splitter 110 is configured to split the input beam into two beams. One beam is reflected off of the fixed mirror 104 back towards the beam splitter 110, while the other beam is reflected off of the moveable mirror 106 back towards the beam splitter 110. The moveable mirror 106 may be coupled to an actuator 108 to displace the movable mirror 106 to the desired position for reflection of the beam. An optical path length difference (OPD) is then created between the reflected beams that is substantially equal to twice the mirror 106 displacement. In some examples, the actuator 108 may include a micro-electro-mechanical systems (MEMS) actuator, a thermal actuator, or other type of actuator.

The reflected beams interfere at the beam splitter 110 to produce modulated light (e.g., an interference pattern), allowing the temporal coherence of the light to be measured at each different Optical Path Difference (OPD) offered by the moveable mirror 106. The signal corresponding to the modulated light may be directed to a sample (not shown) and the output light (scattered light) from the sample may be detected and measured by the detector 112 at many discrete positions of the moveable mirror 106 to produce an interferogram. In some examples, the detector 112 may include a detector array or a single pixel detector. The interferogram data verses the OPD may then be input to a processor (not shown, for simplicity). The spectrum may then be retrieved, for example, using a Fourier transform carried out by the processor.

In some examples, the interferometer 100 may be implemented as a MEMS interferometer 100a (e.g., a MEMS chip). The MEMS chip 100a may then be attached to a printed circuit board (PCB) 116 that may include, for example, one or more processors, memory devices, buses, and/or other components. As used herein, the term MEMS refers to the integration of mechanical elements, sensors, actuators and electronics on a common silicon substrate through microfabrication technology. For example, the microelectronics are typically fabricated using an integrated circuit (IC) process, while the micromechanical components are fabricated using compatible micromachining processes that selectively etch away parts of the silicon wafer or add new structural layers to form the mechanical and electro-mechanical components. One example of a MEMS element is a micro-optical component having a dielectric or metallized surface working in a reflection or refraction mode. Other examples of MEMS elements include actuators, detector grooves and fiber grooves.

In the example shown in FIG. 1, the MEMS interferometer 100a may include the fixed mirror 104, moveable mirror 106, beam splitter 110, and MEMS actuator 108 for moveably controlling the moveable mirror 106. In addition, the MEMS interferometer 100a may include fibers 114 for directing the input beam towards the beam splitter 110 and the output beam from the beam splitter 110 towards the detector (e.g., detector 112). In some examples, the MEMS interferometer 100a may be fabricated using a Deep Reactive Ion Etching (DRIE) process on a Silicon On Insulator (SOI) wafer in order to produce the micro-optical components and other MEMS elements that are able to process free-space optical beams propagating parallel to the SOI substrate. For example, the electro-mechanical designs may be printed on masks and the masks may be used to pattern the design over the silicon or SOI wafer by photolithography. The patterns may then be etched (e.g., by DRIE) using batch processes, and the resulting chips (e.g., MEMS chip 100a) may be diced and packaged (e.g., attached to the PCB 116).

For example, the beam splitter 110 may be a silicon/air interface beam splitter (e.g., a half-plane beam splitter) positioned at an angle (e.g., 45 degrees) from the input beam. The input beam may then be split into two beams L1 and L2, where L1 propagates in air towards the moveable mirror 106 and L2 propagates in silicon towards the fixed mirror 104. Here, L1 originates from the partial reflection of the input beam from the half-plane beam splitter 110, and thus has a reflection angle equal to the beam incidence angle. L2 originates from the partial transmission of the input beam through the half-plane beam splitter 110 and propagates in silicon at an angle determined by Snell's Law. In some examples, the fixed and moveable mirrors 104 and 106 are metallic mirrors, where selective metallization (e.g., using a shadow mask during a metallization step) is used to protect the beam splitter 110. In other examples, the mirrors 104 and 106 are vertical Bragg mirrors that can be realized using, for example, DRIE.

In some examples, the MEMS actuator 108 may be an electrostatic actuator formed of a comb drive and spring. For example, by applying a voltage to the comb drive, a potential difference results across the actuator 108, which induces a capacitance therein, causing a driving force to be generated as well as a restoring force from the spring, thereby causing a displacement of moveable mirror 106 to the desired position for reflection of the beam back towards the beam splitter 110.

Figure 2:
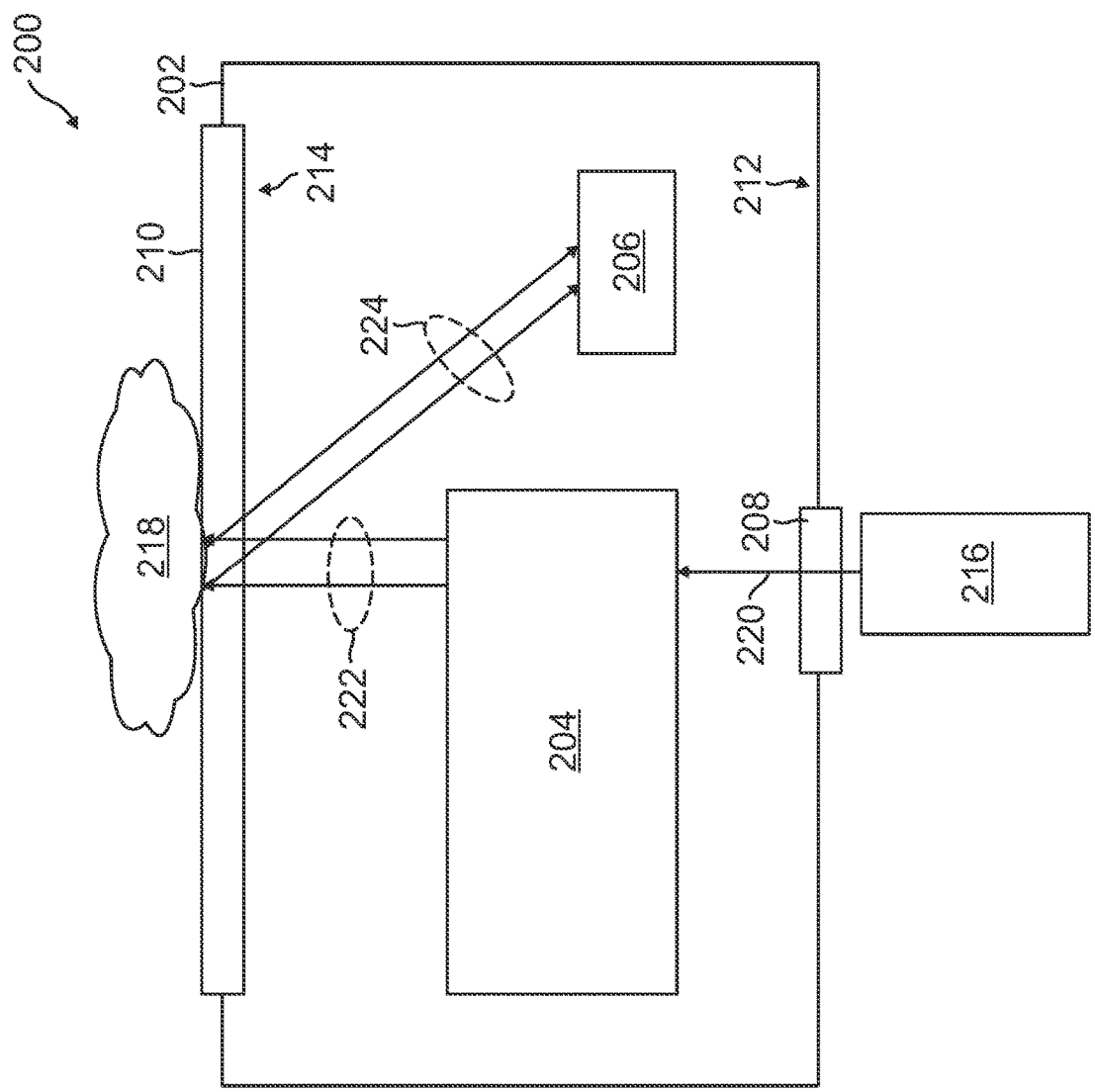
FIG. 2 is a diagram illustrating an example of a compact material analyzer device according to some aspects.

In various aspects of the disclosure, the spectrometer 100 shown in FIG. 1 or other suitable light modulator may be incorporated into a compact material analyzer. FIG. 2 is a diagram illustrating an example of a compact material analyzer device 200 according to some aspects. The compact material analyzer device 200 includes a module 202, such as a package, die, or component, and a light source 216. The module includes a light modulator 204, a detector 206, a first optical window 208, and a second optical window 210. The light modulator 204 may include, for example, a spectrometer (e.g., as shown in FIG. 1), a diffraction grating, a spatial light modulator, a birefringent device, or other suitable device configured to modulate light. For example, the light modulator 204 may include a MEMS chip. In some examples, the detector 206 may be external to the module 202.

The first optical window 208 is positioned on a first side 212 of the module 202, and the second optical window 210 is positioned on a second side 214 of the module 202 opposite the first side 212. The optical windows 208 and 210 may be, for example, glass, sapphire, ceramic, diamond, fused silica, quartz, pyrex, silicon, barium fluoride, calcium fluoride, germanium, zinc selenide and/or plastic optical windows. In some examples, the first optical window 208 may be positioned over an aperture in the module 202. The aperture size and shape may be selected to control and minimize stray light.

The light source 216 is configured to generate input light 220. The input light 220 is directed through the first optical window 208 in the module 202 to the light modulator 204. In some examples, the input light 220 may be directed through the first optical window 208 to the light modulator 204 using one or more optical elements, such as reflectors and/or lenses. The light modulator 204 is configured to attenuate the input light 220 and produce modulated light 222 (e.g., an interference pattern) based on the input light 220 and to direct the modulated light through the second optical window 210 to a sample under test 218. The modulated light 222 is attenuated in power with respect to the input light 220 by an attenuation amount to a level (e.g., power) that is safe for illumination of the sample 218 (e.g., a power level that will prevent damage to the sample 218 due to absorption of the modulated light 222 by the sample 218). In addition, the light source 216 is adjacent the first optical window 208 on the first side 212 of the module 202, and the sample 218 is adjacent the second optical window 210 on the second side 214 of the module 202 to prevent heating of the sample 218 from the light source 216. For example, the light source 216 may be based on black body radiation, and as a result, the temperature of the light source 216 may be high to produce enough radiation power.

In the example shown in FIG. 2, the compact material analyzer 200 is operating in a reflection mode. Thus, the modulated light 222 interacts with the sample 218 and the resulting scattered reflected light (e.g., output light 224) from the sample 218 is directed back through the second optical window 210 to the detector 206. In other examples, the output light 224 from the sample 218 may be received by the detector 206 in a transmission mode or trans-reflection mode, taking into account the diffuse.

In some examples, the detector 206 may be a photodetector that is approximately 200-300 μm diameter. Due to the small size of the detector 206, all of the scattered output light 224 from the sample 218 may not reach the detector 206, thus limiting the analysis of the sample 218. Therefore, in various aspects, the compact material analyzer device 200 may further include a light collection mechanism, such as an optical concentrating element.

Figure 3:
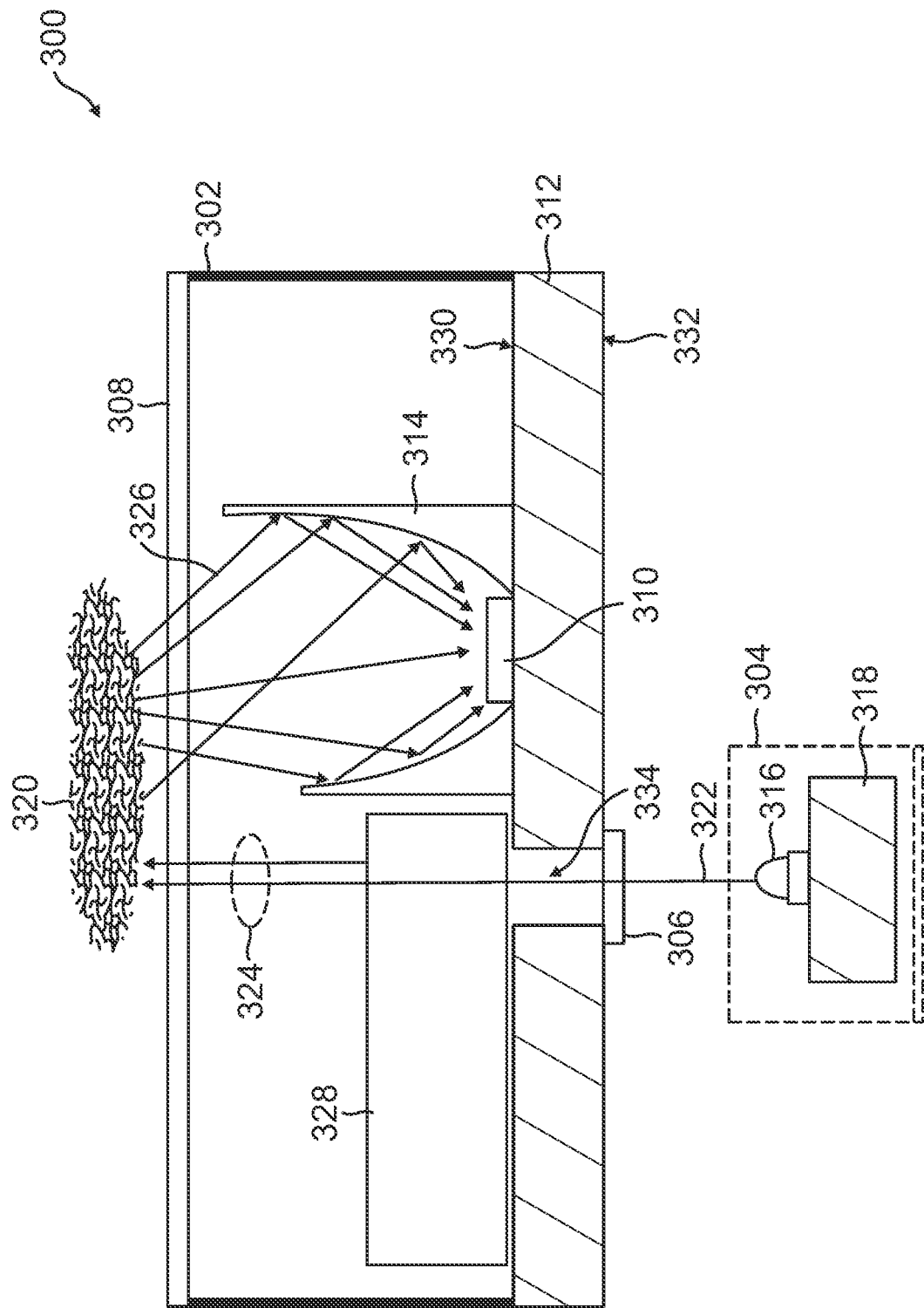
FIG. 3 is a diagram illustrating an example of a compact material analyzer device including an optical concentrating element according to some aspects.

FIG. 3 is a diagram illustrating an example of a compact material analyzer device 300 including an optical concentrating element 314 according to some aspects. The compact material analyzer device 300 includes a first module 302 and a second module 304. Each module 302 and 304 may be a package, die, or component. The first module 302 includes a light modulator 328, a detector 310, a first optical window 306, a second optical window 308, and the optical concentrating element 314. The second module 304 includes a light source 316.

The first module 302 further includes a first substrate 312 having a first surface 330 and a second surface 332 opposite the first surface 330. The first substrate 312 is positioned on a first side of the first module 302, while the second optical window 308 is positioned on a second side of the first module 302. The light modulator 328, the detector 310 and the optical concentrating element 314 are positioned on the first surface of the first substrate 312. The first optical window 306 is positioned on the second surface 332 of the first substrate 312 and is configured to cover an opening (e.g., a hole or aperture) 334 in the first substrate 312. The second module 304 further includes a second substrate 318 having the light source 316 positioned thereon.

The light source 316 is configured to generate input light 322. The input light 322 is directed through the first optical window 306 in the first module 302 to the light modulator 328. The light modulator 328 is configured to attenuate the input light 322 and produce modulated light 324 based on the input light 322. The light modulator 328 is further configured to direct the modulated light 324 through the second optical window 308 to a sample under test 320. The modulated light 324 interacts with the sample 320 and the resulting scattered reflected light (e.g., output light 326) from the sample 320 is directed back through the second optical window 308 into the first module 302. The optical concentrating element 314 is a non-imaging component that is configured to collect the scattered light (e.g., output light 326) and direct the output light 326 into the detector 310. In some examples, the optical concentrating element 314 functions as a grounded shield between the detector 310 and the light modulator 328.

Figure 4:
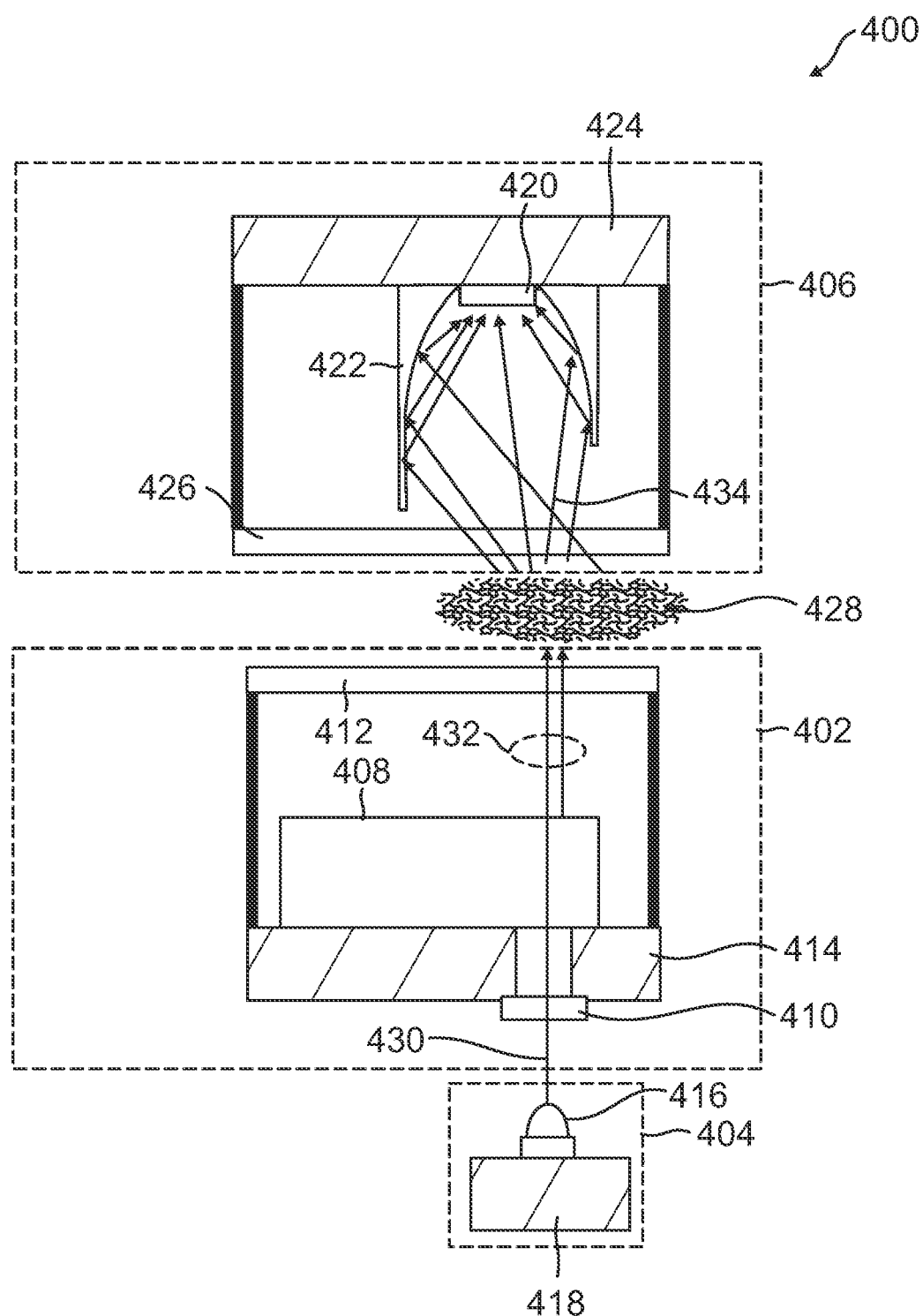
FIG. 4 is a diagram illustrating an example of a distributed arrangement of a compact material analyzer device according to some aspects.

FIG. 4 is a diagram illustrating an example of a distributed arrangement of a compact material analyzer device 400 according to some aspects. In the example shown in FIG. 4, the compact material analyzer device 400 includes a light modulation module 402, a source module 404, and a light detection module 406. Each module 402, 404, and 406 may be a package, die, or component. The light modulation module 402 includes a light modulator 408, a first optical window 410 and a second optical window 412. The source module 404 includes a light source 416. The light detection module 406 includes a detector 420 and optical concentrating element 422. By isolating the detector 420 in a separate module, as shown in FIG. 4, the detector 420 can be protected from thermal aggressors in the light modulation module 402. In addition, a cooling element (not shown) may further be integrated with the detector 420.

The light modulation module 402 further includes a first substrate 414 positioned on a first side of the light modulation module 402, while the second optical window 412 is positioned on a second side of the light modulation module 402. The light modulator 408 is positioned on a first surface of the first substrate 414 opposite the second optical window 412. The first optical window 410 is positioned on a second surface of the first substrate 414. The first optical window 410 further covers an opening (e.g., a hole or aperture) in the first substrate 414.

The light source module 404 includes a second substrate 418 having the light source 416 positioned thereon. The light detection module 406 includes a third substrate 424 on a first side of the light detection module 406 and a third optical window 426 on a second side of the light detection module 406. The detector 420 and optical concentrating element 422 are positioned on the third substrate 424 opposite the third optical window 426.

The light source 416 is configured to generate input light 430. The input light 430 is directed through the first optical window 410 in the light modulation module 402 to the light modulator 408. The light modulator 408 is configured to attenuate the input light 430 and produce modulated light 432 based on the input light 430. The light modulator 408 is further configured to direct the modulated light 432 through the second optical window 412 to a sample under test 428.

In the example shown in FIG. 4, the compact material analyzer 400 is operating in a transmission mode. Thus, the modulated light 432 interacts with the sample 428 and the resulting scattered transmitted light (e.g., output light 434) from the sample 428 is directed through the third optical window 426 into the light detection module 406. The optical concentrating element 422 is configured to collect the scattered light (e.g., output light 434) and direct the output light 434 into the detector 420.

Figure 5:
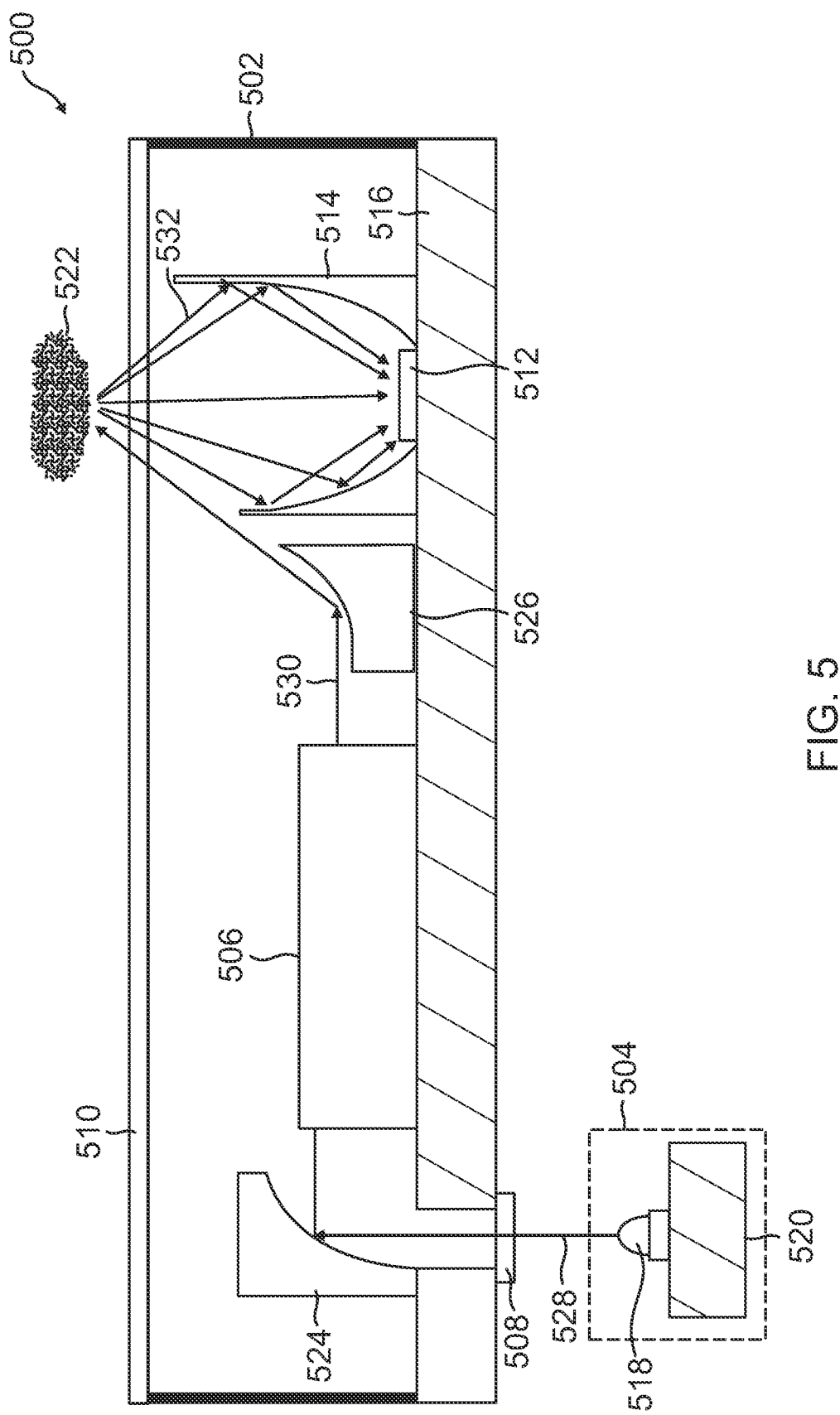
FIG. 5 is a diagram illustrating an example of a compact material analyzer device including light redirecting optical elements according to some aspects.

FIG. 5 is a diagram illustrating an example of a compact material analyzer device 500 including light redirecting optical elements according to some aspects. The compact material analyzer device 500 includes a first module 502 and a second module 504. Each module 502 and 504 may be a package, die, or component. The first module 502 includes a light modulator 506, a detector 512, a first optical window 508, a second optical window 510, and an optical concentrating element 514. The second module 504 includes a light source 518.

The first module 502 further includes a first substrate 516 positioned on a first side of the first module 502, while the second optical window 510 is positioned on a second side of the first module 502. The light modulator 506, the detector 512 and the optical concentrating element 514 are positioned on a first surface of the first substrate 516. The first optical window 508 is positioned on a second surface of the first substrate 516 and is configured to cover an opening (e.g., a hole or aperture) in the first substrate 516. In addition, the first module 502 further includes a first optical element 524, such as a first reflector, and a second optical element 526, such as a second reflector. The reflectors 524 and 526 are configured to change the optical axis direction of light. Each of the reflectors 524 and 526 has a surface profile configured to maximize light coupling efficiency. The reflectors 524 and 526 may be, for example, free-form optics and can be moldable for mass production. The second module 504 further includes a second substrate 520 having the light source 518 positioned thereon.

The light source 518 is configured to generate input light 528. The input light 528 is directed through the first optical window 508 in the first module 502 to the first reflector 524. The first reflector 524 redirects the input light 528 towards the light modulator 506. Thus, the first reflector 524 changes the optical axis direction of the input light 528 from an out-of-plane direction with respect to a plane of the first substrate 516 to an in-plane direction with respect to the plane of the first substrate 516, which corresponds to the optical axis of the light modulator 506. The light modulator 506 is configured to attenuate the input light 528 and produce modulated light 530 based on the input light 530. The light modulator 506 is further configured to direct the modulated light 530 to the second reflector 526. The second reflector 526 redirects the modulated light 540 towards a sample under test 522. Thus, the modulated light 530 reflected from the second reflector 526 is directed through the second optical window 510 to the sample 522.

The modulated light 530 interacts with the sample 522 and the resulting scattered reflected light (e.g., output light 532) from the sample 522 is directed back through the second optical window 510 into the first module 502. The optical concentrating element 514 is configured to collect the scattered light (e.g., output light 532) and direct the output light 532 into the detector 512.

Figure 6:
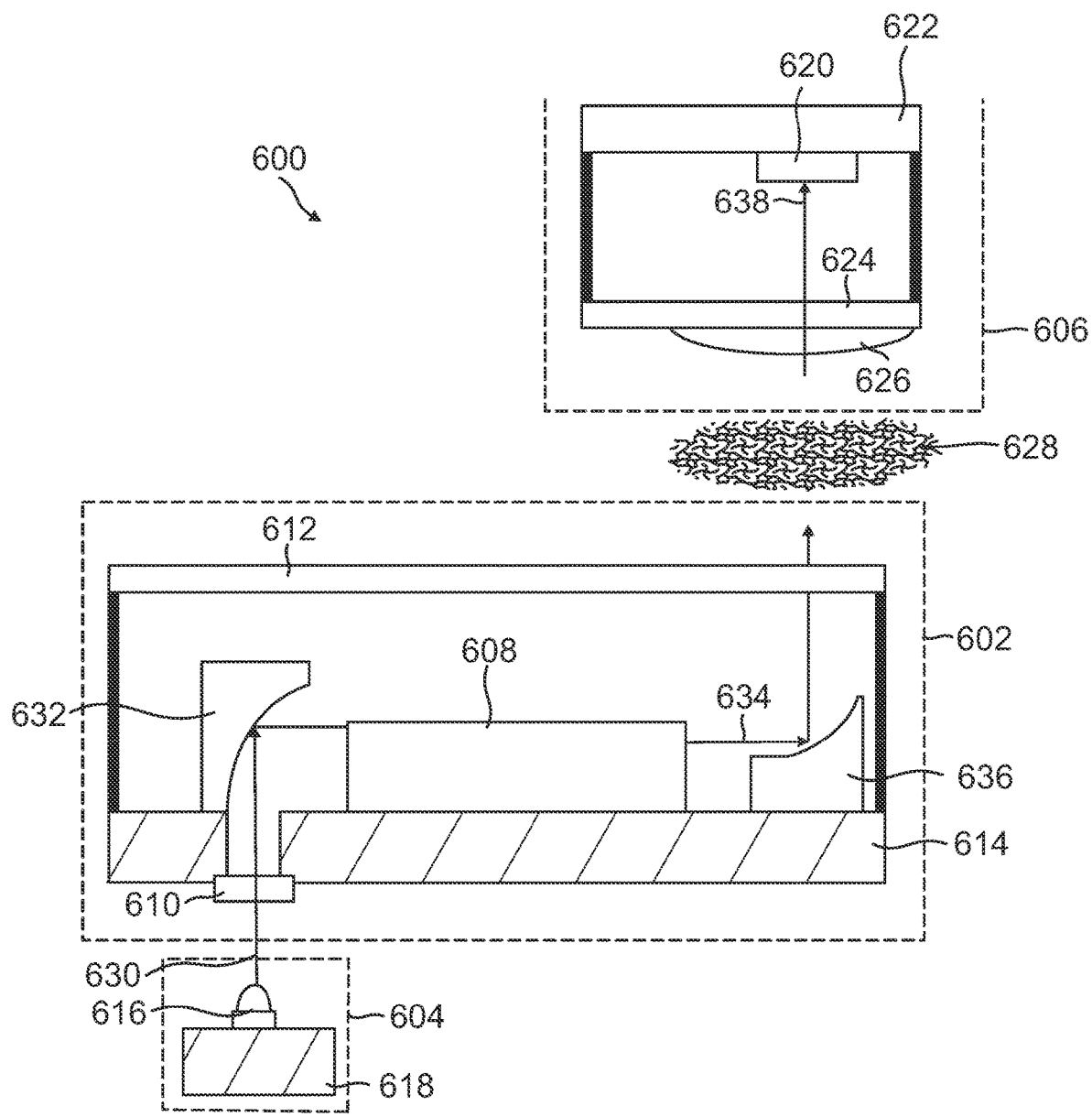
FIG. 6 is a diagram illustrating an example of a distributed arrangement of the compact material analyzer device including light redirecting optical elements according to some aspects.

FIG. 6 is a diagram illustrating an example of a distributed arrangement of the compact material analyzer device 600 including light redirecting optical elements according to some aspects. In the example shown in FIG. 6, the compact material analyzer device 600 includes a light modulation module 602, a source module 604, and a light detection module 606. Each module 602, 604, and 606 may be a package, die, or component. The light modulation module 602 includes a light modulator 608, a first optical window 610 and a second optical window 612. The source module 604 includes a light source 616. The light detection module 606 includes a detector 620. By isolating the detector 620 in a separate module, as shown in FIG. 6, the detector 620 can be protected from thermal aggressors in the light modulation module 602. In addition, a cooling element (not shown) may further be integrated with the detector 620.

The light modulation module 602 further includes a first substrate 614 positioned on a first side of the light modulation module 602, while the second optical window 612 is positioned on a second side of the light modulation module 602. The light modulator 608 is positioned on a first surface of the first substrate 614 opposite the second optical window 612. The first optical window 610 is positioned on a second surface of the first substrate 614. The first optical window 610 further covers an opening (e.g., a hole or aperture) in the first substrate 614. In addition, the light modulation module 602 further includes a first reflector 632 and a second reflector 636. The reflectors 632 and 636 are configured to change the optical axis direction of light.

The light source module 604 includes a second substrate 618 having the light source 616 positioned thereon. The light detection module 606 includes a third substrate 622 on a first side of the light detection module 606 and a third optical window 624 on a second side of the light detection module 606. The detector 620 is positioned on the third substrate 622 opposite the third optical window 624. In addition, an optical focusing element 626, such as a lens, may be integrated on the third optical window 624. In other examples, the optical focusing element 626 may be inside the light detection module 606.

The light source 616 is configured to generate input light 630. The input light 630 is directed to the first reflector 632. The first reflector 632 redirects the input light 630 towards the light modulator 608. Thus, the first reflector 632 changes the optical axis direction of the input light 630 from an out-of-plane direction with respect to a plane of the first substrate 614 to an in-plane direction with respect to the plane of the first substrate 614, which corresponds to the optical axis of the light modulator 608. The light modulator 608 is configured to attenuate the input light 630 and produce modulated light 634 based on the input light 630. The light modulator 608 is further configured to direct the modulated light 634 to the second reflector 636. The second reflector 636 redirects the modulated light 634 towards a sample under test 628. Thus, the modulated light 634 reflected from the second reflector 636 is directed through the second optical window 612 to the sample 628.

In the example shown in FIG. 6, the compact material analyzer 600 is operating in a transmission mode. Thus, the modulated light 634 interacts with the sample 628 and the resulting scattered transmitted light (e.g., output light 638) from the sample 628 is directed through the third optical window 624 into the light detection module 606. The optical focusing element 626 is configured to focus the output light 638 into the detector 620.

Figure 7:
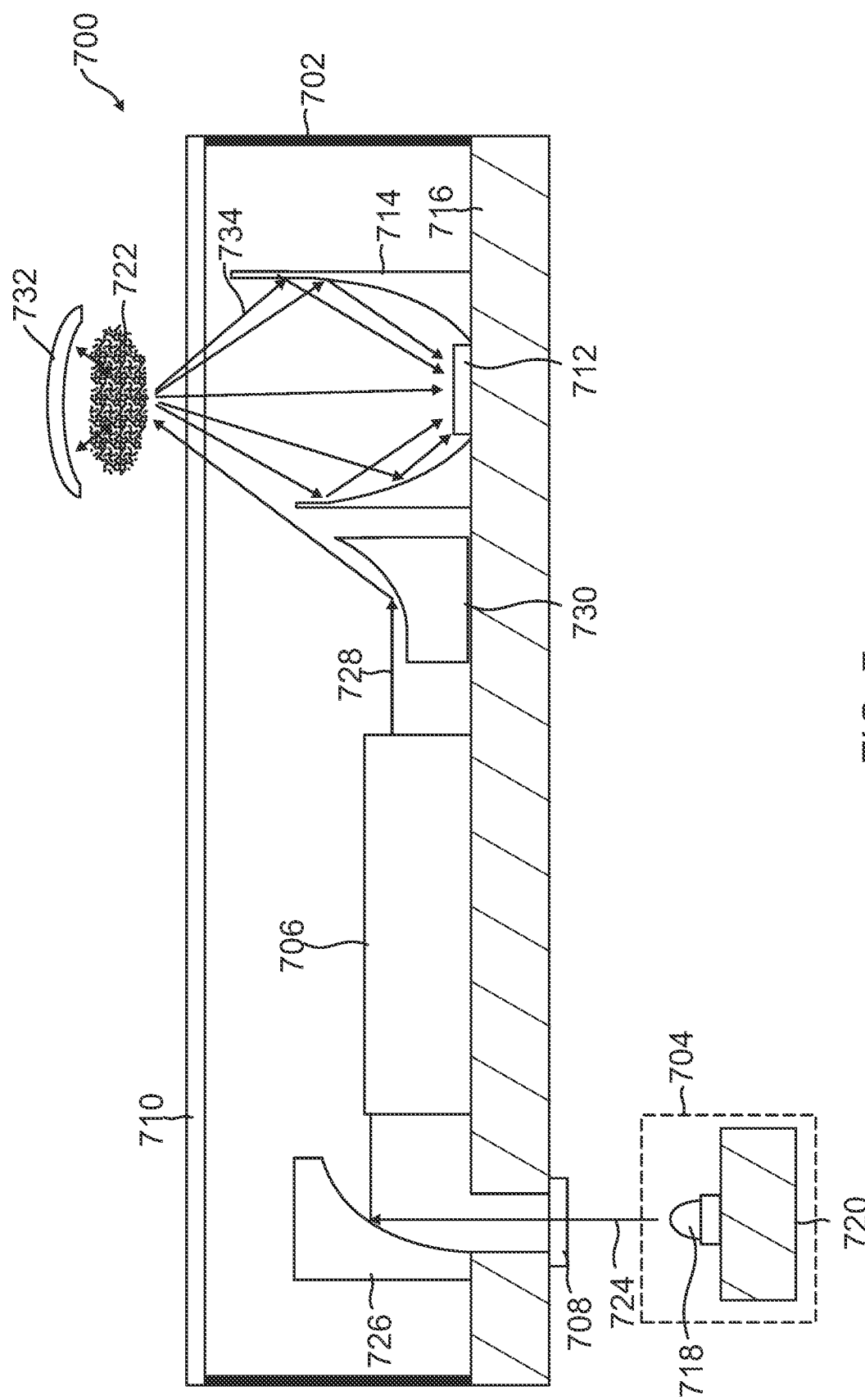
FIG. 7 is a diagram illustrating another example of a compact material analyzer device including light redirecting optical elements according to some aspects.

FIG. 7 is a diagram illustrating another example of a compact material analyzer device 700 including light redirecting optical elements according to some aspects. The compact material analyzer device 700 includes a first module 702 and a second module 704. Each module 702 and 704 may be a package, die, or component. The first module 702 includes a light modulator 706, a detector 712, a first optical window 708, a second optical window 710, and an optical concentrating element 714. The second module 704 includes a light source 718.

The first module 702 further includes a first substrate 716 positioned on a first side of the first module 702, while the second optical window 710 is positioned on a second side of the first module 702. The light modulator 706, the detector 712 and the optical concentrating element 714 are positioned on a first surface of the first substrate 716. The first optical window 708 is positioned on a second surface of the first substrate 716 and is configured to cover an opening (e.g., a hole or aperture) in the first substrate 716. In addition, the first module 702 further includes a first reflector 726 and a second reflector 730. The reflectors 726 and 730 are configured to change the optical axis direction of light. The second module 704 further includes a second substrate 720 having the light source 718 positioned thereon.

The light source 718 is configured to generate input light 724. The input light 724 is directed through the first optical window 708 in the first module 702 to the first reflector 726. The first reflector 726 redirects the input light 724 towards the light modulator 706. Thus, the first reflector 726 changes the optical axis direction of the input light 724 from an out-of-plane direction with respect to a plane of the first substrate 716 to an in-plane direction with respect to the plane of the first substrate 716, which corresponds to the optical axis of the light modulator 706. The light modulator 706 is configured to attenuate the input light 724 and produce modulated light 728 based on the input light 724. The light modulator 706 is further configured to direct the modulated light 728 to the second reflector 730. The second reflector 730 redirects the modulated light 728 towards a sample under test 722. Thus, the modulated light 728 reflected from the second reflector 730 is directed through the second optical window 710 to the sample 722.

In the example shown in FIG. 7, the sample 722 is disposed between the second optical window 710 and a third reflector 732 (e.g., a reflecting surface). Thus, the third reflector 732 is shown positioned adjacent the sample 722 and opposite the second optical window 710. The third reflector 732 may include, for example, a specular reflection surface, a diffuse reflection surface, an optical cavity, or reference material. In some examples, the third reflector 732 is configured to maximize the amount of output light 734 received by the detector 712 from the sample 722. For example, the modulated light 728 can interact with the sample 722 and the resulting scattered light (e.g., output light 734) is either directly coupled into the detector 712 or reflected by the third reflector 732 back to the sample for additional scattering and redirection to the detector 712 via the second optical window 710 and the optical concentrating element 714.

Figure 8:
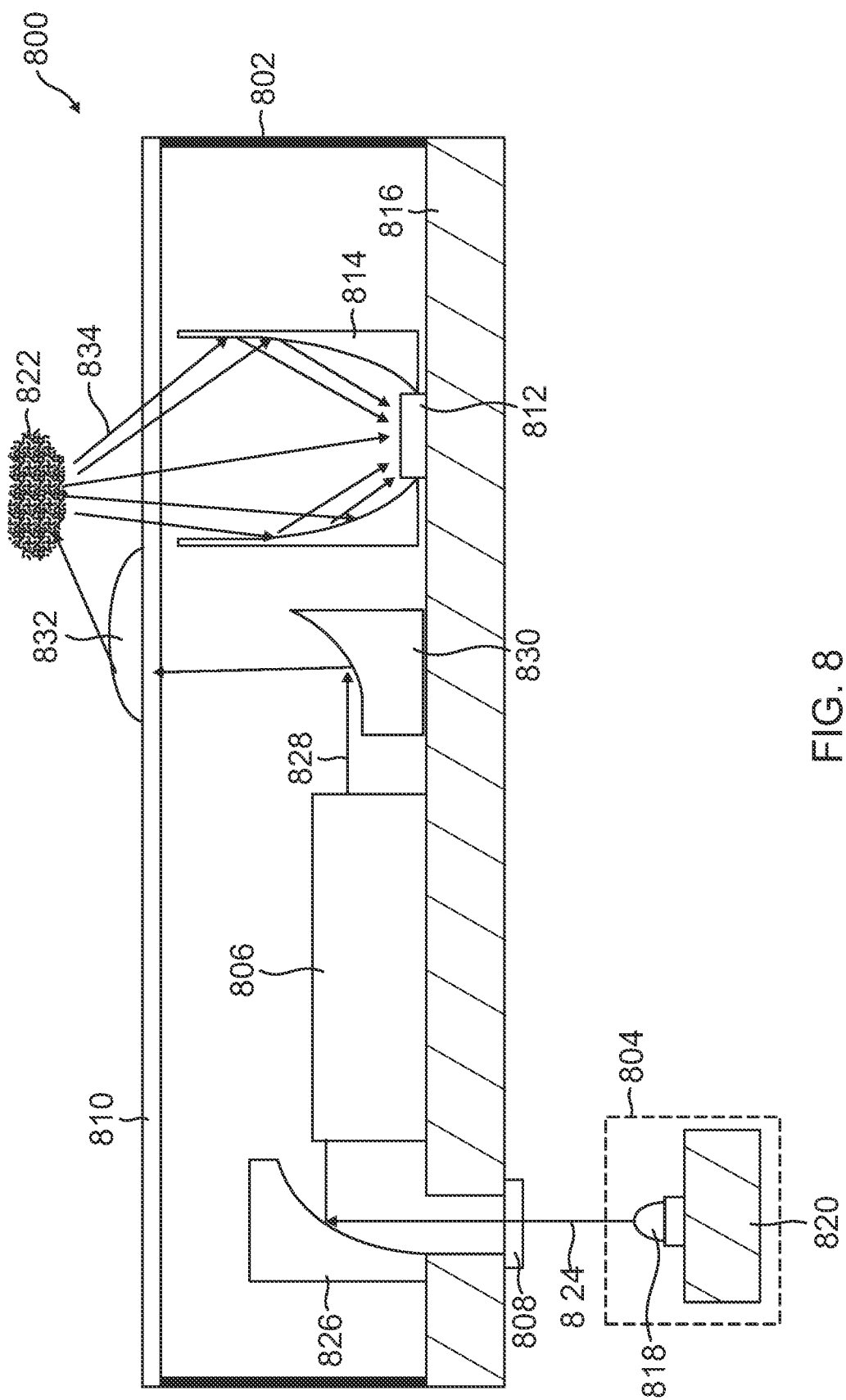
FIG. 8 is a diagram illustrating another example of a compact material analyzer device including light redirecting optical elements according to some aspects.

FIG. 8 is a diagram illustrating another example of a compact material analyzer device 800 including light redirecting optical elements according to some aspects. The compact material analyzer device 800 includes a first module 802 and a second module 804. Each module 802 and 804 may be a package, die, or component. The first module 802 includes a light modulator 806, a detector 812, a first optical window 808, a second optical window 810, and an optical concentrating element 814. The second module 804 includes a light source 818.

The first module 802 further includes a first substrate 816 positioned on a first side of the first module 802, while the second optical window 810 is positioned on a second side of the first module 802. The light modulator 806, the detector 812 and the optical concentrating element 814 are positioned on a first surface of the first substrate 816. The first optical window 808 is positioned on a second surface of the first substrate 816 and is configured to cover an opening (e.g., a hole or aperture) in the first substrate 816. In addition, the first module 802 further includes a first reflector 826 and a second reflector 830. The reflectors 826 and 830 are configured to change the optical axis direction of light. The second module 804 further includes a second substrate 820 having the light source 818 positioned thereon.

The light source 818 is configured to generate input light 824. The input light 824 is directed through the first optical window 808 in the first module 802 to the first reflector 826. The first reflector 826 redirects the input light 824 towards the light modulator 806. Thus, the first reflector 826 changes the optical axis direction of the input light 824 from an out-of-plane direction with respect to a plane of the first substrate 816 to an in-plane direction with respect to the plane of the first substrate 816, which corresponds to the optical axis of the light modulator 806. The light modulator 806 is configured to attenuate the input light 824 and produce modulated light 828 based on the input light 824. The light modulator 806 is further configured to direct the modulated light 828 to the second reflector 830. The second reflector 830 redirects the modulated light 828 towards a sample under test 822. Thus, the modulated light 828 reflected from the second reflector 830 is directed through the second optical window 810 to the sample 822.

In the example shown in FIG. 8, the second optical window 810 includes an optical element 832 positioned thereon. The optical element 832 may be, for example, an optical refractive or diffractive element, such as a lens, prism, or grating. The optical element 832 is configured to increase the angle of the modulated light 828 with respect to the normal to the first substrate 816. In some examples, the optical element 832 may be a refractive or diffractive lens that is deposited on or molded with the second optical window 810. The lens surface can be in the form of a prism for light redirection or with a curved surface for transforming the wavefront as well. The optical element 832 is configured to increase the physical separation between the light modulator 806 and the detector 812 to reduce direct electromagnetic coupling therebetween.

The modulated light 828 directed to the sample 822 via the optical element 832 interacts with the sample 822 and the resulting scattered reflected light (e.g., output light 834) from the sample 822 is directed back through the second optical window 810 into the first module 802. The optical concentrating element 814 is configured to collect the scattered light (e.g., output light 834) and direct the output light 834 into the detector 812.

Figure 9:
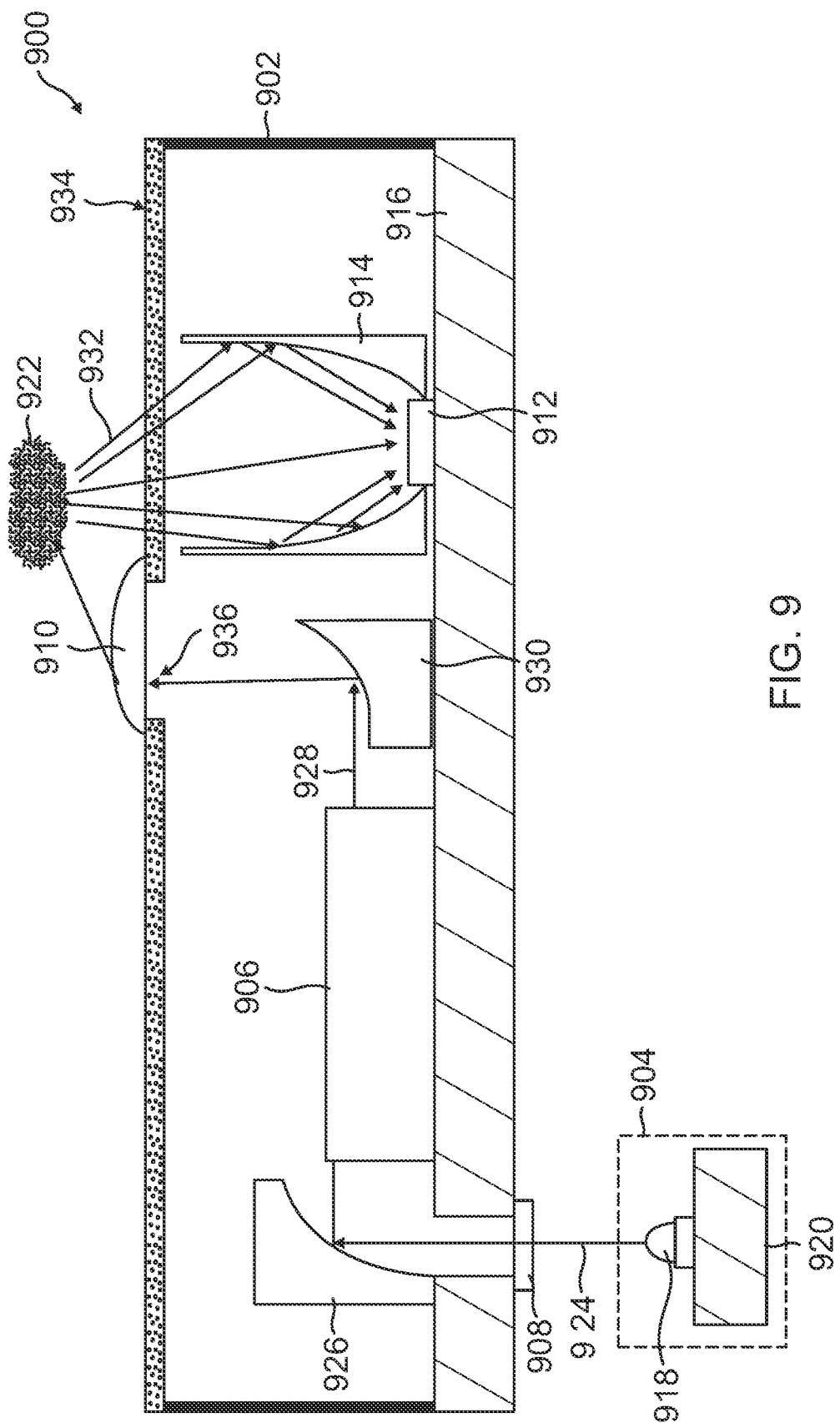
FIG. 9 is a diagram illustrating another example of a compact material analyzer device including light redirecting optical elements according to some aspects.

FIG. 9 is a diagram illustrating another example of a compact material analyzer device 900 including light redirecting optical elements according to some aspects. The compact material analyzer device 900 includes a first module 902 and a second module 904. Each module 902 and 904 may be a package, die, or component. The first module 902 includes a light modulator 906, a detector 912, a first optical window 908, a second optical window 910, and an optical concentrating element 914. The second module 904 includes a light source 918.

The first module 902 further includes a first substrate 916 positioned on a first side of the first module 902, while the second optical window 910 is positioned on a second side of the first module 902. The light modulator 906, the detector 912 and the optical concentrating element 914 are positioned on a first surface of the first substrate 916. The first optical window 908 is positioned on a second surface of the first substrate 916 and is configured to cover an opening (e.g., a hole or aperture) in the first substrate 916. In addition, the first module 902 further includes a first reflector 926 and a second reflector 930. The reflectors 926 and 930 are configured to change the optical axis direction of light. The second module 904 further includes a second substrate 920 having the light source 918 positioned thereon.

The light source 918 is configured to generate input light 924. The input light 924 is directed through the first optical window 908 in the first module 902 to the first reflector 926. The first reflector 926 redirects the input light 924 towards the light modulator 906. Thus, the first reflector 926 changes the optical axis direction of the input light 924 from an out-of-plane direction with respect to a plane of the first substrate 916 to an in-plane direction with respect to the plane of the first substrate 916, which corresponds to the optical axis of the light modulator 906. The light modulator 906 is configured to attenuate the input light 924 and produce modulated light 928 based on the input light 924. The light modulator 906 is further configured to direct the modulated light 928 to the second reflector 930. The second reflector 930 redirects the modulated light 928 towards a sample under test 922. Thus, the modulated light 928 reflected from the second reflector 930 is directed through the second optical window 910 to the sample 922.

In the example shown in FIG. 9, the second optical window 910 is a lensed optical window covering an opening 936 (e.g., a hole or aperture) in an opaque surface 934 of the first module 902. The lensed optical window 910 is configured to increase the physical separation between the light modulator 906 and the detector 912 to reduce direct electromagnetic coupling therebetween. The modulated light 928 directed to the sample 922 via the lensed optical window 910 interacts with the sample 922 and the resulting scattered reflected light (e.g., output light 932) from the sample 922 is directed back through the opaque surface 934 into the first module 902. The optical concentrating element 914 is configured to collect the scattered light (e.g., output light 932) and direct the output light 932 into the detector 912.

Figure 10B:
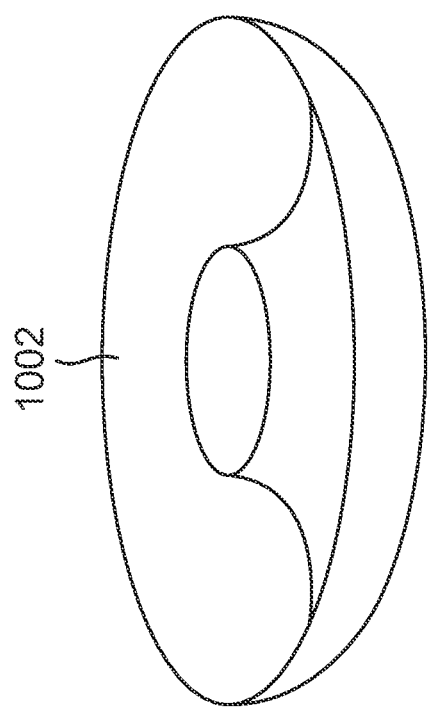
FIGS. 10A and 10B are diagrams illustrating an example of an optical concentrating element according to some aspects.
Figure 10A:
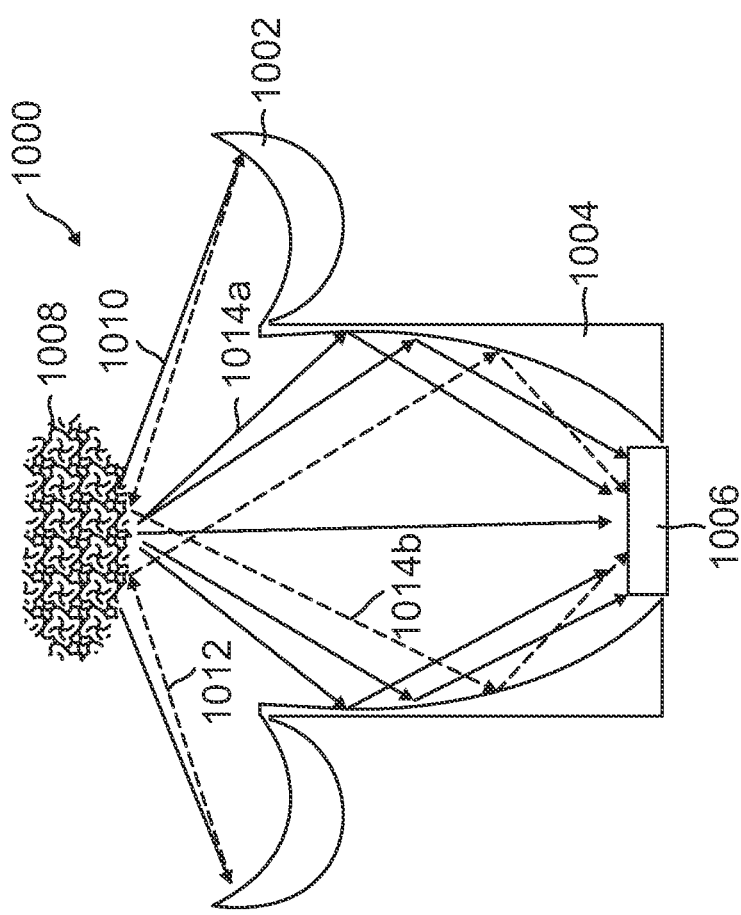

FIGS. 10A and 10B are diagrams illustrating an example of an optical concentrating element 1000 according to some aspects. The optical concentrating element 1000 is a reflection-type compound optical concentrator. The compound optical concentrator 1000 includes a deep inner concentrator 1004 surrounded by a shallow outer concentrator 1002. The shallow outer concentrator 1002 is in the form of a bottom half of a ring torus or anchor ring. In other examples, the outer concentrator 1002 may have a freeform shape. The compound optical concentrator 1000 is designed to collect a larger spot size from a sample 1008. For example, first scattered light 1014a from the sample 1008 may be collected directly from the sample 1008 by the inner concentrator 1004 to a detector 1006. In addition, light 1010 collected by the outer concentrator 1002 may be reflected back onto the sample 1008 as reflected light 1012 in a light recycling process in which the light 1012 reflected back to the sample 1008 produces second scattered light 1014b that may be collected by the inner concentrator 1004 to the detector 1006.

Figure 11A:
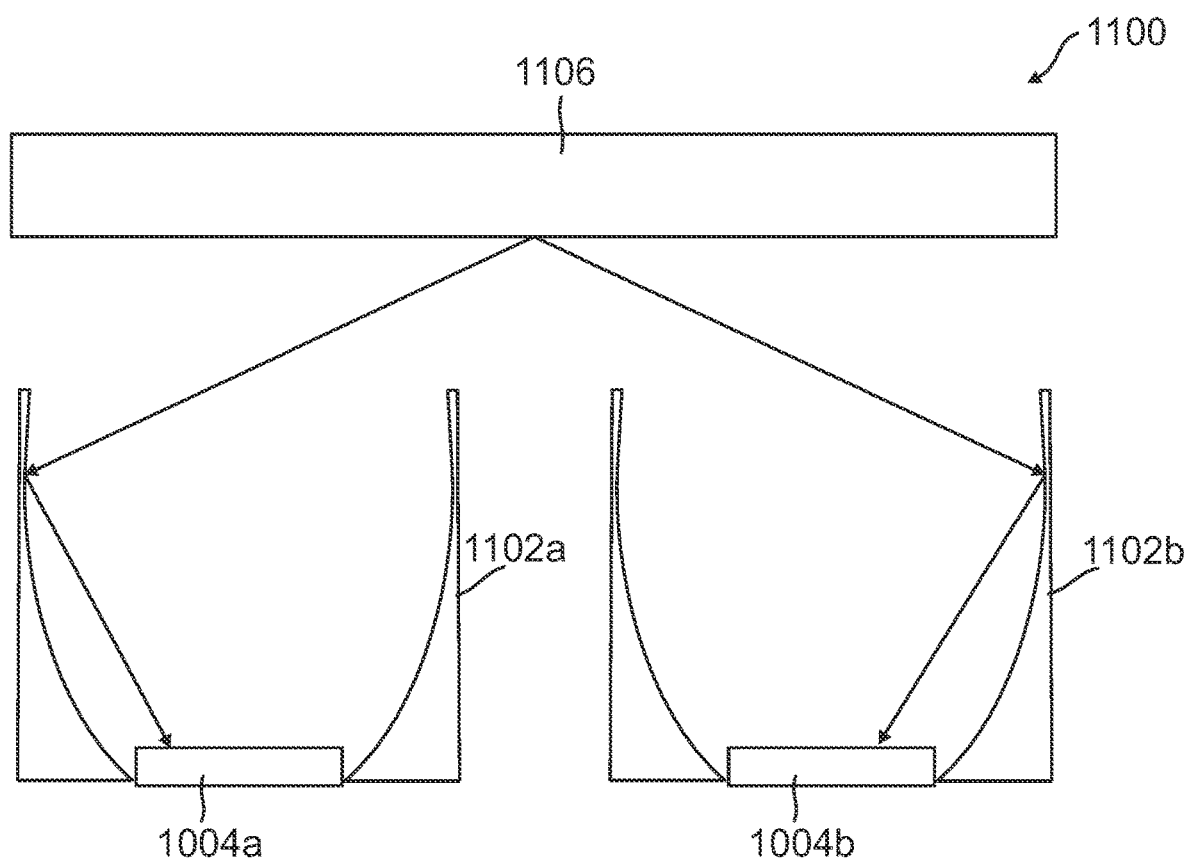
FIG. 11A is a diagram illustrating an example of a light detection unit including multiple detectors according to some aspects.

FIG. 11A is a diagram illustrating an example of a light detection unit 1100 including multiple detectors according to some aspects. The light detection unit may be in the form of a separate light detection module, as shown in FIGS. 4 and/or 6, or may be integrated within a light modulation module, as shown in FIGS. 2, 3, and/or 7-9. In the example shown in FIG. 11A, the light detection unit 1100 includes more than one optical concentrating element and more than one detector. For example, the light detection unit 1100 includes a first optical concentrating element 1102a configured to collect output light from a sample 1106 to a first detector 1104a and a second optical concentrating element 1102b configured to collect output light from the sample 1106 to a second detector 1104b. In other examples, there may be more than two optical concentrating elements in the form of an array of optical concentrating elements. In addition, there may be more than two detectors.

In some examples, the optical concentrating elements 1102a and 1102b may fill the angular space, but may be oriented differently with respect to the sample 1106. For example, the optical concentrating elements 1102a and 1102b may fill the spatial space by shifting the optical concentrating elements 1102a and 1102b laterally with respect to one another.

In some examples, the detectors 1104a and 1104b may be operating in the same wavelength range. For example, the detectors 1104a and 1104b may each detect output light from the sample 1106 simultaneously and the resulting signal from each of the detectors 1104a and 1104b may be combined (added). In other examples, the detectors 1104a and 1104b may be operating in a different wavelength range, each covering a different portion of a spectrum (e.g., the visible, NIR and mid-infrared (MIR) spectral ranges). An example of a detector operating in the NIR may include an InGaAs, extended InGaAs photodiode, or PbS photodiode. Examples of a detector operating in the MIR may include a PbSe or MCT photodetector or a thermal detector.

Figure 11B:
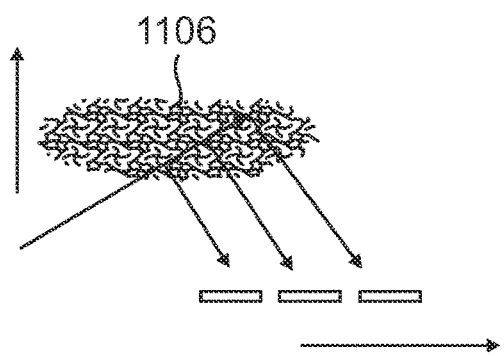
FIGS. 11B and 11C are diagrams illustrating detection at different spatial locations of a sample using multiple detectors according to some aspects.
Figure 11C:
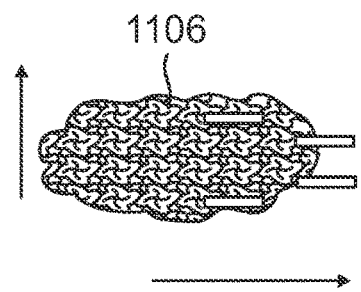

In some examples, the detectors 1104a and 1104b may be arranged to receive output light from different spatial locations in the sample 1106. For example, as shown in FIGS. 11B and 11C, the detectors may be arranged to receive output light from different depths or layers of the sample 1106 (e.g., as shown in FIG. 11B) and/or different lateral positions of the sample 1106 (e.g., as shown in FIGS. 11B and 11C). For example, collecting light from the epidermis or dermis layer in the skin. By using more than one detector to collect output light from different spatial locations in the sample 1106, the throughput of the collected light may be increased. In addition, the resulting signals from the detectors may be used to determine how the properties of the sample 1106 change with depth.

Figure 12B:
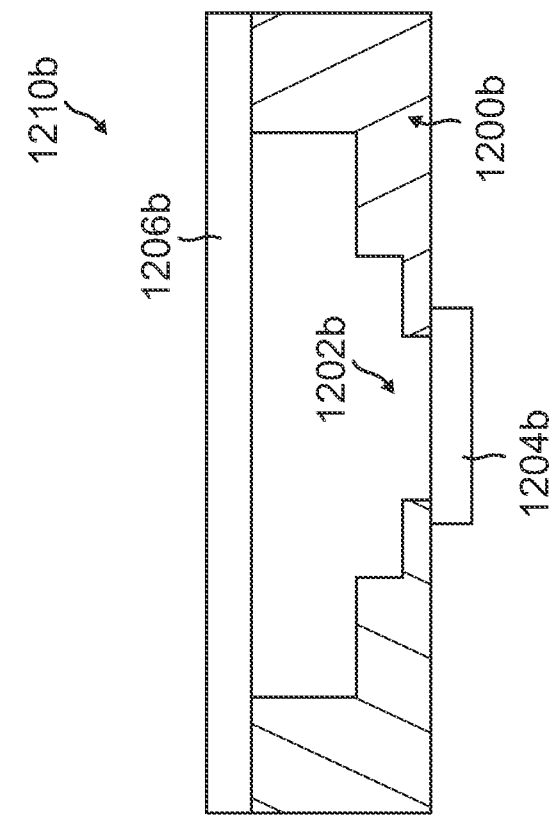
FIGS. 12A and 12B are diagrams illustrating example configurations of a light modulation module of the compact material analyzer device according to some aspects.
Figure 12A:
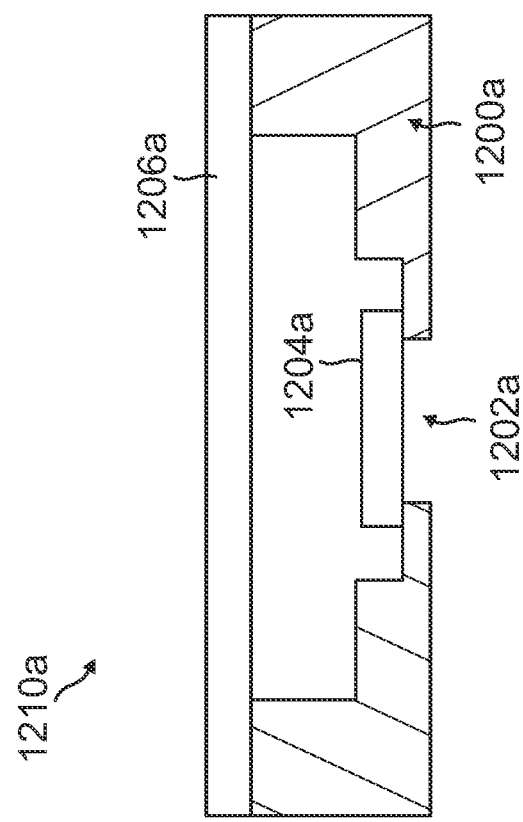

FIGS. 12A and 12B are diagrams illustrating example configurations of a light modulation module 1210a and 1210b of the compact material analyzer device according to some aspects. In some examples, the light modulation module 1210a or 1210b may be a ceramic package where the ceramic layers are built or pos-processed by machining. In the example shown in FIG. 12A, the light modulation module 1210a includes a substrate 1200a (e.g., a ceramic substrate) having an opening 1202a therein, a first (bottom) optical window 1204a, and a second (top) optical window 1206a, which may function as a lid or cover to the light modulation module 1210a. In addition, in the example shown in FIG. 12B, the light modulation module 1210b includes a substrate 1200*b* (e.g., a ceramic substrate) having an opening 1202*b*, a first (bottom) optical window 1204*b*, and a second (top) optical window 1206*b*, which may function as a lid or cover to the light modulation module 1210*b*.

The size of the opening 1202*a* or 1202*b* is configured to balance between the amount of light coupled into the light modulation module, the stray light that may not be properly modulated, and the mechanical rigidity of the substrate 1200*a* or 1200*b*. As shown in FIG. 12A, the bottom optical window 1204*a* may be positioned on an inner surface (inner side) of the substrate 1200*a*. As shown in FIG. 12B, the bottom optical window 1204*b* may be positioned on an outer surface (outer side) of the substrate 1200*b*. In some examples, other optical components of the light modulation module 1210 (e.g., light modulator, reflector, etc.) may be positioned over the bottom optical window 1204*a* or 1204*b*. In this example, the window material of the bottom optical window 1204*a* or 1204*b* may be selected with a matched coefficient of thermal expansion and light transparency in the wavelength range of interest.

Figure 13:
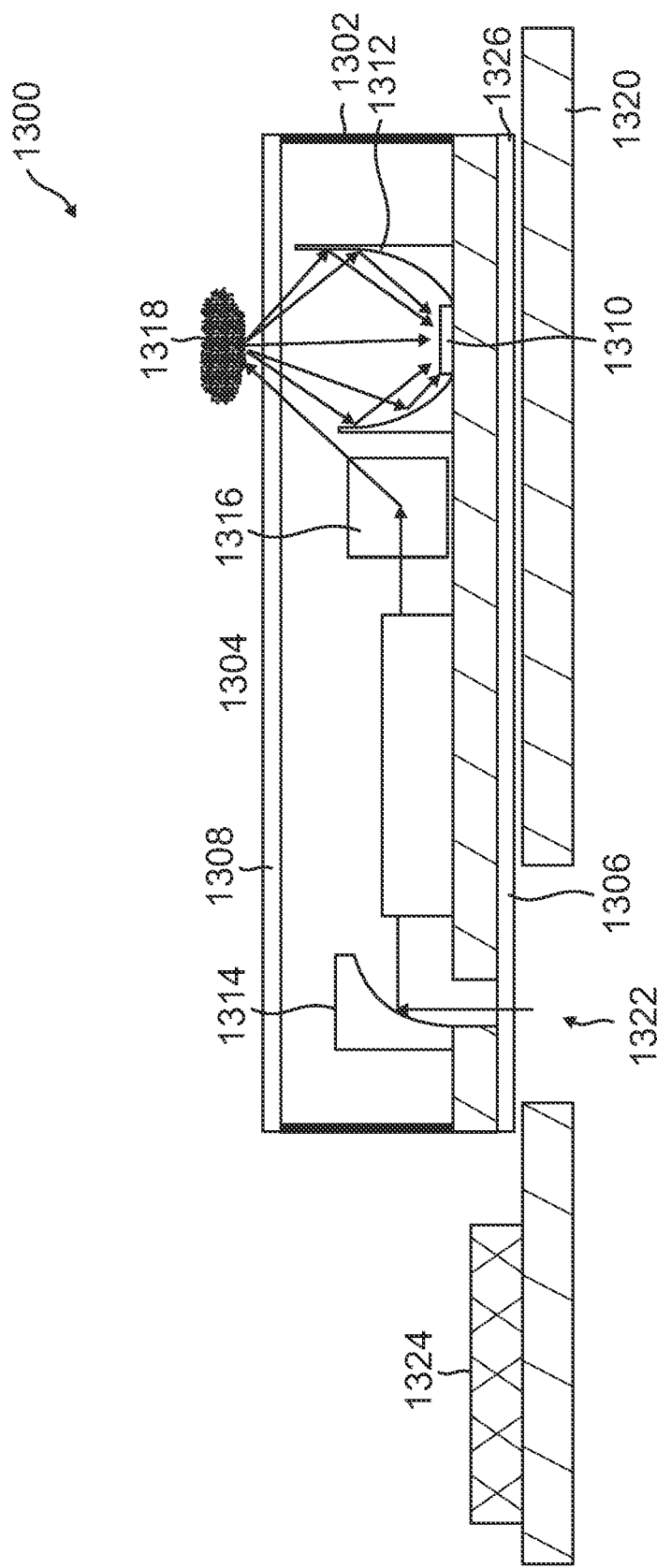
FIG. 13 is a diagram illustrating an example of a compact material analyzer device integrated with other components according to some aspects.

FIG. 13 is a diagram illustrating an example of a compact material analyzer device 1300 integrated with other components according to some aspects. The compact material analyzer device 1300 includes a module 1302, such as a package. The module 1302 includes a light modulator 1304, a detector 1310, a first optical window 1306, a second optical window 1308, and an optical concentrating element 1312. The first optical window 1306 is positioned along an entire length of a first side of the module 1302, while the second optical window 1308 is positioned along an entire length of a second side of the module 1302. Thus, the first optical window 1306 functions as a base or bottom of the module 1302 and the second optical window 1308 functions as a cover (lid) or top of the module 1302. A sample under test 1318 may be placed on an external surface of the second optical window 1308.

The module 1302 further includes a first substrate 1326 having a first surface and a second surface. The light modulator 1304, the detector 1310 and the optical concentrating element 1312 are positioned on the first surface of the first substrate 1326. The first optical window 1306 is positioned on the second surface of the first substrate 1326 and is configured to cover an opening (e.g., a hole or aperture) in the first substrate 1326. In addition, the module 1302 further includes a first reflector 1314 and a second reflector 1316. The reflectors 1314 and 1316 are configured to change the optical axis direction of light.

The module 1302 may be integrated with other electronic components 1324 via a second substrate (e.g., a printed circuit board (PCB)) 1320. For example, the PCB 1320 may be configured to assemble and connect the compact material analyzer device 1300 together with the other electronic components 1324. In an example, the module 1302 may be connected to the PCB 1320 using wire bonding or surface mounting. The PCB 1320 may further include an opening (e.g., hole) 1322 to couple input light into the module 1302.

Figure 14:
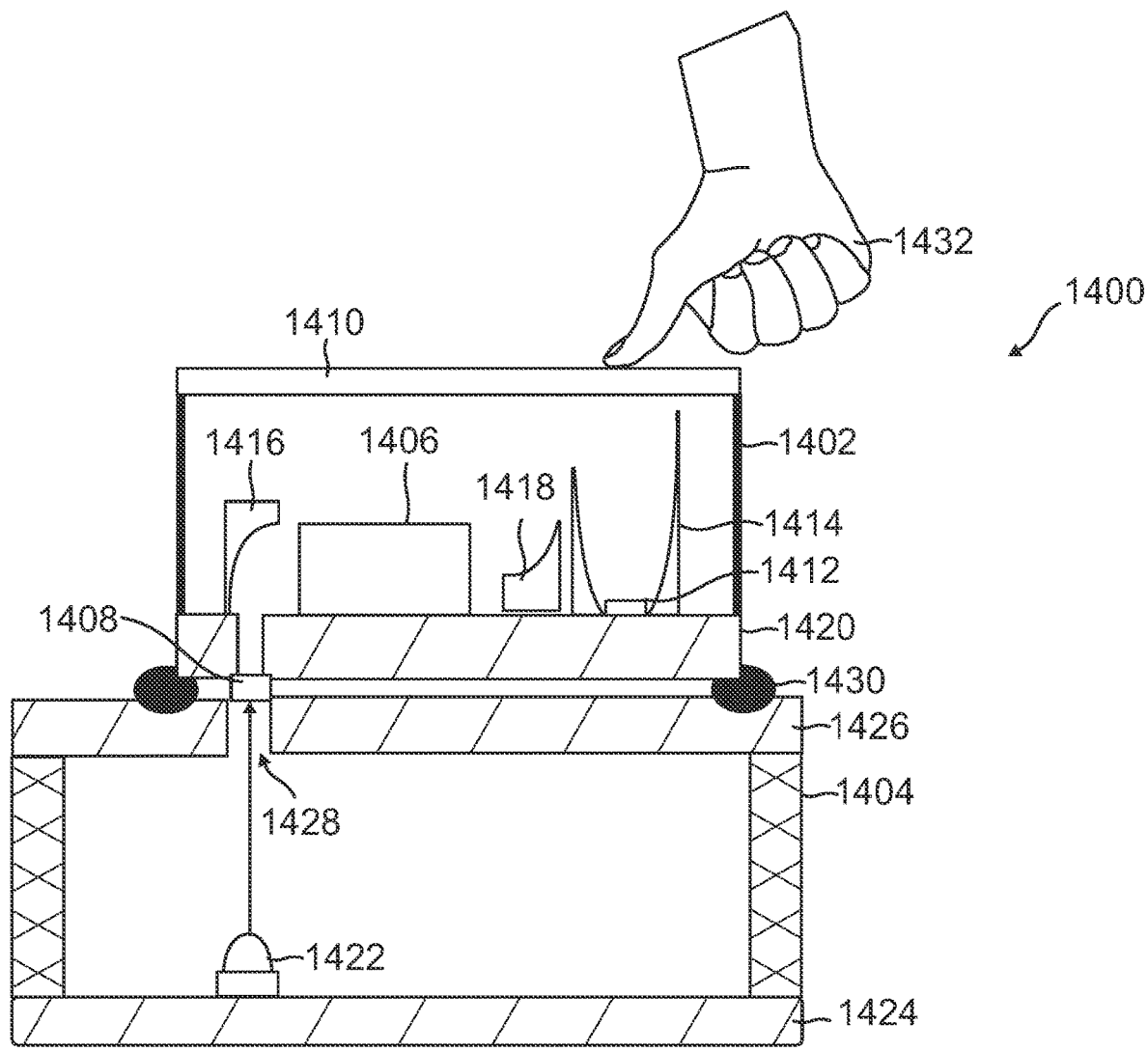
FIG. 14 is a diagram illustrating an example of a stacked configuration of a compact material analyzer device according to some aspects.

FIG. 14 is a diagram illustrating an example of a stacked configuration of a compact material analyzer device 1400 according to some aspects. The compact material analyzer device 1400 includes a first module 1402 and a second module 1404. Each module 1402 and 1404 may be, for example, a package. The modules 1402 and 1404 are stacked in a package on package (PoP) structure. The first module 1402 includes a light modulator 1406, a detector 1412, a first optical window 1408, a second optical window 1410, and an optical concentrating element 1414. A sample 1432 (e.g., skin) may be placed on the second optical window 1410.

The first module 1402 further includes a first substrate 1420 positioned on a first side of the first module 1402, while the second optical window 1410 is positioned on a second side of the first module 1402. The light modulator 1406, the detector 1412 and the optical concentrating element 1414 are positioned on a first surface of the first substrate 1420. The first optical window 1408 is positioned on a second surface of the first substrate 1420 and is configured to cover an opening (e.g., a hole or aperture) in the first substrate 1420. In addition, the first module 1402 further includes a first reflector 1416 and a second reflector 1418. The reflectors 1416 and 1418 are configured to change the optical axis direction of light.

The second module 1404 includes a light source 1422. The second module 1404 further includes a second substrate 1424 and a third substrate 1426. The light source 1422 is positioned on the second substrate 1424. The third substrate 1426 includes an opening (e.g., a hole or aperture) for passing input light from the light source 1422 into the first module 1402. Each of the second substrate 1424 and the third substrate 1426 may be, for example, PCBs. In some examples, the first substrate 1420 may be an interposer with frames for thermal dissipation. The interposer 1420 may be connected to the third substrate (e.g., PCB) 1426 through bump structures 1430 (e.g., solder/flux). The interposer 1420 enabled spreading out (fan out) of a connection to a wider pitch or re-routing a connection to a different connection. The stacked configuration of the substrates 1420, 1424, and 1426 provides mechanical and electrical connectivity between the components in the first module (package) 1402 and between the components in first module 1402 and the second module 1404.

Figure 15:
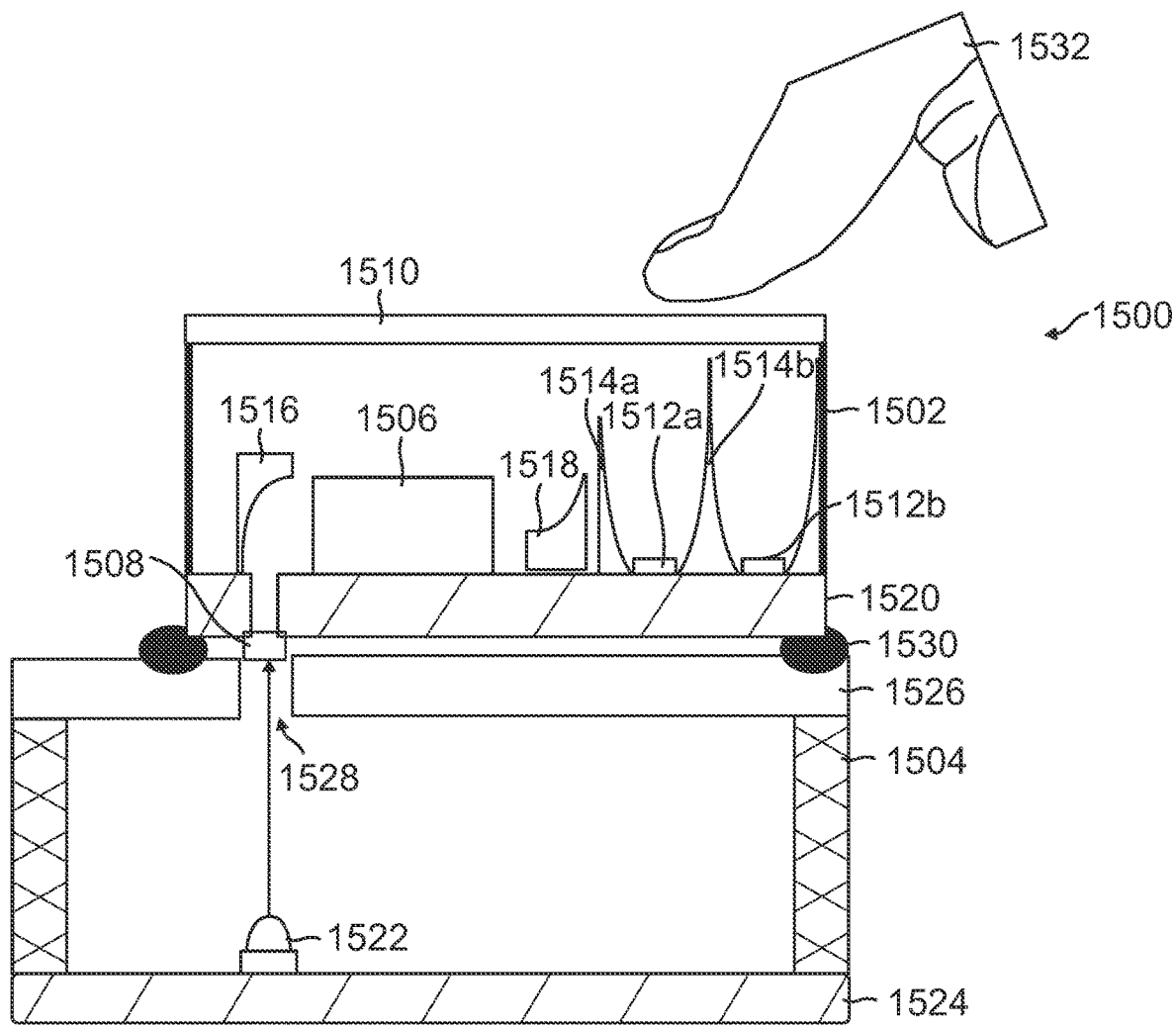
FIG. 15 is a diagram illustrating another example of a stacked configuration of a compact material analyzer device according to some aspects.

FIG. 15 is a diagram illustrating another example of a stacked configuration of a compact material analyzer device 1500 according to some aspects. The compact material analyzer device 1500 includes a first module 1502 and a second module 1504. Each module 1502 and 1504 may be, for example, a package. The modules 1502 and 1504 are stacked in a package on package (PoP) structure. The first module 1502 includes a light modulator 1506, a first optical window 1508, and a second optical window 1510. A sample 1532 may be placed on the second optical window 1510.

In the example shown in FIG. 15, the first module 1502 further includes multiple detectors. For example, the first module 1502 can include a first detector 1512*a* and a second detector 1512*b*. The first module 1502 further includes a respective optical concentrating element 1514*a* and 1514*b* for each of the detectors 1512*a* and 1512*b*. By having multiple detectors 1512*a* and 1512*b*, the spatial throughput may be increased or the spectral range may be extended.

The first module 1502 further includes a first substrate 1520 positioned on a first side of the first module 1502, while the second optical window 1510 is positioned on a second side of the first module 1502. The light modulator 1506, the detectors 1512*a* and 1512*b* and the optical concentrating elements 1514*a* and 1514*b* are positioned on a first surface of the first substrate 1520. The first optical window 1508 is positioned on a second surface of the first substrate 1520 and is configured to cover an opening (e.g., a hole or aperture) in the first substrate 1520. In addition, the first module 1502 further includes a first reflector 1516 and a second reflector 1518. The reflectors 1516 and 1518 are configured to change the optical axis direction of light.

The second module 1504 includes a light source 1522. The second module 1504 further includes a second substrate 1524 and a third substrate 1526. The light source 1522 is positioned on the second substrate 1524. The third substrate 1526 includes an opening (e.g., a hole or aperture) for passing input light from the light source 1522 into the first module 1502. Each of the second substrate 1524 and the third substrate 1526 may be, for example, PCBs. In some examples, the first substrate 1520 may be an interposer with frames for thermal dissipation. The interposer 1520 may be connected to the third substrate (e.g., PCB) 1526 through bump structures 1530 (e.g., solder/flux). As in the example shown in FIG. 14, the stacked configuration of the substrates 1520, 1524, and 1526 provides mechanical and electrical connectivity between the components in the first module (package) 1502 and between the components in first module 1502 and the second module 1504.

Figure 16:
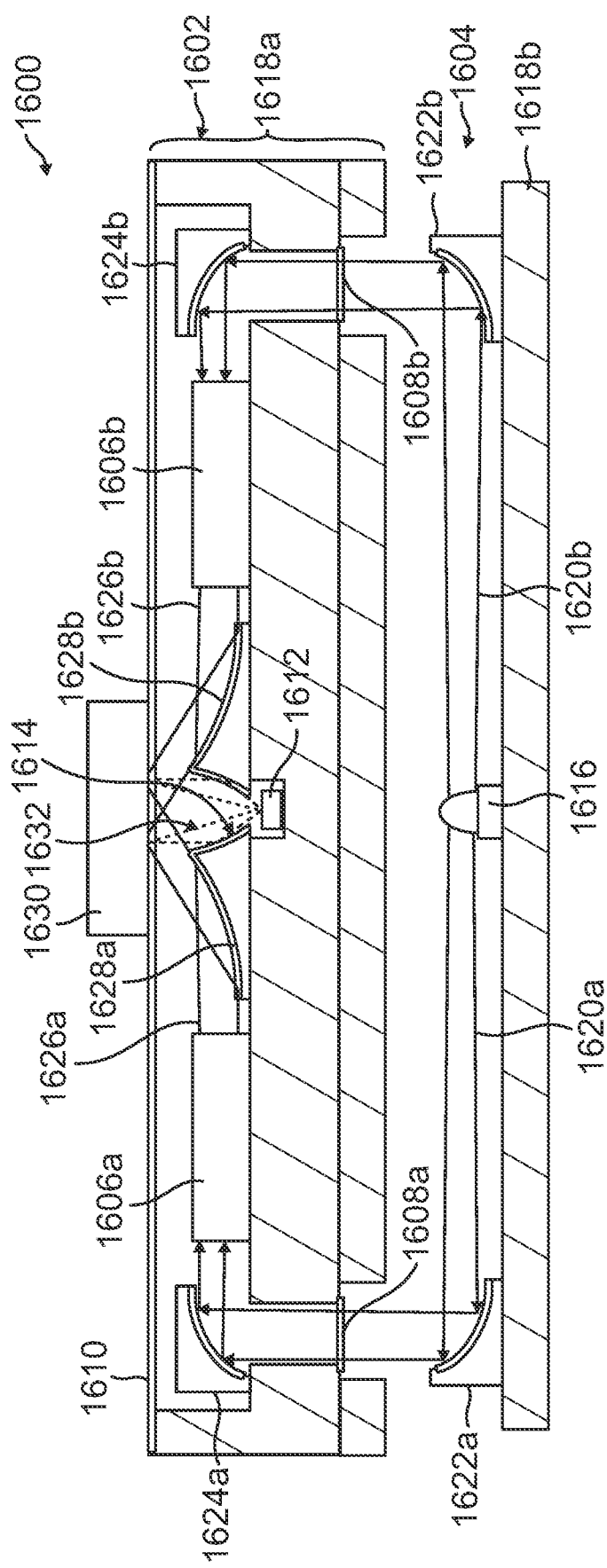
FIG. 16 is a diagram illustrating an example of a compact material analyzer device including multiple light modulation mechanisms according to some aspects.

FIG. 16 is a diagram illustrating an example of a compact material analyzer device 1600 including multiple light modulation mechanisms according to some aspects. The compact material analyzer device 1600 includes a first module 1602 and a second module 1604. Each of the modules 1602 and 1604 may be, for example, a package or other integrated device. The first module 1602 includes two or more light modulators. For example, a first light modulator 1606a and a second light modulator 1606b are shown, for simplicity. The first module 1602 further includes a first optical window 1608a, a second optical window 1608b, a third optical window 1610, and a first substrate 1618a. The first optical window 1608a and the second optical window 1608b are positioned on a first side of the first module 1602 and the third optical window 1610 is positioned on a second side of the first module 1602. The first optical window 1608a and the second optical window 1608b are positioned covering respective openings (e.g., apertures or holes) in the first substrate 1618a on the first side of the first module 1602. A sample 1630 may be placed on the third optical window 1610.

The first module 1602 further includes a detector 1612, an optical concentrating element 1614, a first set of reflectors 1624a, 1624b, and a second set of reflectors 1628a, and 1628b. The reflectors 1624a, 1624b, 1628a, and 1628b are configured to change the optical axis direction of light. The second set of reflectors 1628a and 1628b may be, for example, curved reflectors surrounding the optical concentrating element 1614.

The second module 1604 includes a light source 1616 and a third set of reflectors 1622a and 1622b. The second module 1604 further includes a second substrate 1618b. The light source 1616 and reflectors 1622a and 1622b may be positioned on the second substrate 1618b.

The light source 1616 is configured to generate and emit input light 1620a and 1620b in multiple directions. The third set of reflectors 1622a and 1622b are configured to direct the respective input light 1620a and 1620b through the first optical window 1608a and the second optical window 1608b, respectively, in the first module 1602 to the first set of reflectors 1624a and 1624b. The first set of reflectors 1624a and 1624b are configured to redirect the respective input light 1620a and 1620b towards a respective light modulator 1606a and 1606b. Thus, the reflector 1624a directs the input light 1620a to the first light modulator 1606a and the reflector 1624b directs the input light 1620b to the second light modulator 1606b. Each light modulator 1606a and 1606b is configured to attenuate the respective input light 1620a and 1620b and produce respective modulated light 1626a and 1626b based on the respective input light 1620a and 1620b. The light modulators 1606a and 1606b are further configured to direct the respective modulated light 1626a and 1626b to the second set of reflectors 1628a and 1628b. The second set of reflectors 1628a and 1628b redirect the modulated light 1626a and 1626b towards the sample 1630. Thus, the modulated light 1626a and 1626b reflected from the second set of reflectors 1628a and 1628b is directed through the third optical window 1610 to the sample 1630. By using multiple light modulators 1606a and 1606b, the amount of modulated power incident on the sample 1630 may be increased.

The modulated light 1626a and 1626b interacts with the sample 1630 and the resulting scattered reflected light (e.g., output light 1632) from the sample 1630 is directed back through the third optical window 1610 into the first module 1602. The optical concentrating element 1614 is configured to collect the scattered light (e.g., output light 1632) and direct the output light 1632 into the detector 1612. The detector 1612 collects the superposition of the two reflected modulated light beams 1626a and 1626b (e.g., interference patterns), thus doubling the signal-to-noise ratio. In some examples, the two light modulators 1606a and 1606b (e.g., MEMS chips) may be synchronized to reduce the phase shift between the two interference patterns 1626a and 1626b and to maximize the signal.

FIGS. 17A and 17B are diagrams illustrating another example of a compact material analyzer device 1700 including multiple light modulation mechanisms according to some aspects. FIG. 17B illustrates opposing side views of the compact material analyzer device 1700. The compact material analyzer device 1700 includes a first module 1702 and a second module 1704. Each of the modules 1702 and 1704 may be, for example, a package or other integrated device. The first module 1702 includes two or more light modulation mechanisms integrated in a single light modulation device 1706 (e.g., a MEMS chip). For example, the light modulation device 1706 may include a first light modulator 1706a and a second light modulator 1706b.

The first module 1702 further includes a first optical window 1708, a second optical window 1710, a detector 1712, an optical concentrating element 1714, a first reflector 1728a, a second reflector 1728b, a third reflector 1724, and a first substrate 1716. The first optical window 1708 is positioned on a first side of the first module 1702 and the second optical window 1710 is positioned on a second side of the first module 1702. The first optical window 1708 is positioned covering an opening (e.g., aperture or hole) in the first substrate 1716 on the first side of the first module 1702. A sample 1730 may be placed on the second optical window 1710. The second module 1704 includes a light source 1718 and a second substrate 1720. The light source 1718 is positioned on the second substrate 1720.

The light source 1718 is configured to generate input light 1722 and is oriented with respect to the first optical window 1708 to emit the input light 1722 through the first optical window 1708 to the third reflector 1724. The third reflector 1724 is configured to direct the input light 1722 into the light modulation device 1706. The input light 1722 then passes through each of the light modulators 1706a and 1706b within the light modulation device 1706 to produce respective modulated light 1726a and 1726b based on the input light 1722. Each of the light modulators 1706a and 1706b are further configured to direct the respective modulated light 1726a and 1726b to a respective one of the first and second reflectors 1728a and 1728b. For example, the first modulator 1706a may be configured to direct the modulated light 1726a via a first waveguide 1734a to the first reflector 1728a. In addition, the second modulator 1706b may be configured to direct the modulated light 1726b via a second waveguide 1734*b* to the second reflector 1728*b*. The first and second reflectors 1728*a* and 1728*b* are configured to redirect the modulated light 1726*a* and 1726*b*, respectively, towards the sample 1730. Thus, the modulated light 1726*a* and 1726*b* reflected from the first and second reflectors 1728*a* and 1728*b* is directed through the second optical window 1710 to the sample 1730.

The modulated light 1726*a* and 1726*b* interacts with the sample 1730 and the resulting scattered reflected light (e.g., output light 1732) from the sample 1730 is directed back through the second optical window 1710 into the first module 1702. The optical concentrating element 1714 is configured to collect the scattered light (e.g., output light 1732) and direct the output light 1732 into the detector 1712. As in the example shown in FIG. 16, the detector 1712 collects the superposition of the two reflected modulated light beams 1726*a* and 1726*b* (e.g., interference patterns), thus doubling the signal-to-noise ratio.

FIGS. 18A and 18B are diagrams illustrating another example of a compact material analyzer device 1800 including a Mach Zehnder interferometer according to some aspects. The compact material analyzer device 1800 includes a first module 1802 and a second module 1804. Each of the modules 1802 and 1804 may be, for example, a package or other integrated device. The first module 1802 includes a Mach Zehnder interferometer 1806 (e.g., a light modulator) configured to produce two complementary beams/interference patterns.

The first module 1802 further includes a first optical window 1808, a second optical window 1810, and a first substrate 1818*a*. The first optical window 1808 is positioned on a first side of the first module 1802 and the second optical window 1810 is positioned on a second side of the first module 1802. The first optical window 1808 is positioned covering an opening (e.g., aperture or hole) in the first substrate 1818*a* on the first side of the first module 1802. A sample 1830 may be placed on the second optical window 1810. The first module 1802 further includes a first detector 1812*a*, a second detector 1812*b*, a first optical concentrating element 1814*a*, a second optical concentrating element 1814*b*, a first reflector 1828*a*, a second reflector 1828*b*, and a third reflector 1824. The first reflector 1828*a* and the second reflector 1828*b* are each integrated with a respective one of the first and second optical concentrating elements 1814*a* and 1814*b*.

The second module 1804 includes a light source 1816 and a second substrate 1818*b*. The light source 1816 is positioned on the second substrate 1818*b*. The light source 1816 is configured to generate input light 1822 and is oriented with respect to the first optical window 1808 to emit the input light 1822 through the first optical window 1808 to the third reflector 1824. The third reflector 1824 is configured to direct the input light 1822 into the Mach Zehnder interferometer 1806. The Mach Zehnder interferometer 1806 can be configured to produce respective modulated light 1826*a* and 1826*b* (e.g., complementary beams/interference patterns) based on the input light 1822. The Mach Zehnder interferometer 1806 is further configured to direct the respective modulated light 1826*a* and 1826*b* to a respective one of the first and second reflectors 1828*a* and 1828*b*. For example, the Mach Zehnder interferometer 1806 may be configured to direct the modulated light 1826*a* via a first waveguide 1834*a* to the first reflector 1828*a* and the modulated light 1826*b* via a second waveguide 1834*b* to the second reflector 1828*b*. The first and second reflectors 1828*a* and 1828*b* are configured to redirect the modulated light 1826*a* and 1826*b*, respectively, towards the sample 1830. Thus, the modulated light 1826*a* and 1826*b* reflected from the first and second reflectors 1828*a* and 1828*b* is directed through the second optical window 1810 to the sample 1830.

Each beam of modulated light 1826*a* and 1826*b* interacts with a different spot 1830*a* and 1830*b* on the sample 1830 to increase the effective collected spot size of the sample 1830. The resulting scattered reflected light (e.g., output light 1832*a* and 1832*b*) from the sample 1830 is directed back through the second optical window 1810 into the first module 1802. The first optical concentrating element 1814*a* is configured to collect the scattered light (e.g., output light 1832*a*) from a first spot 1830*a* and direct the output light 1832*a* into the first detector 1812*a*. The second optical concentrating element 1814*b* is configured to collect the scattered light (e.g., output light 1832*b*) from a second spot 1830*b* and direct the output light 1832*b* into the second detector 1812*b*. The detectors 1812*a* and 1812*b* may be configured to collect the respective output light 1832*a* and 1832*b* at the same time, thus increasing the signal-to-noise ratio with improved averaging of the electrical and spatial noise due to non-homogeneity of the sample 1830.

Figure 19:
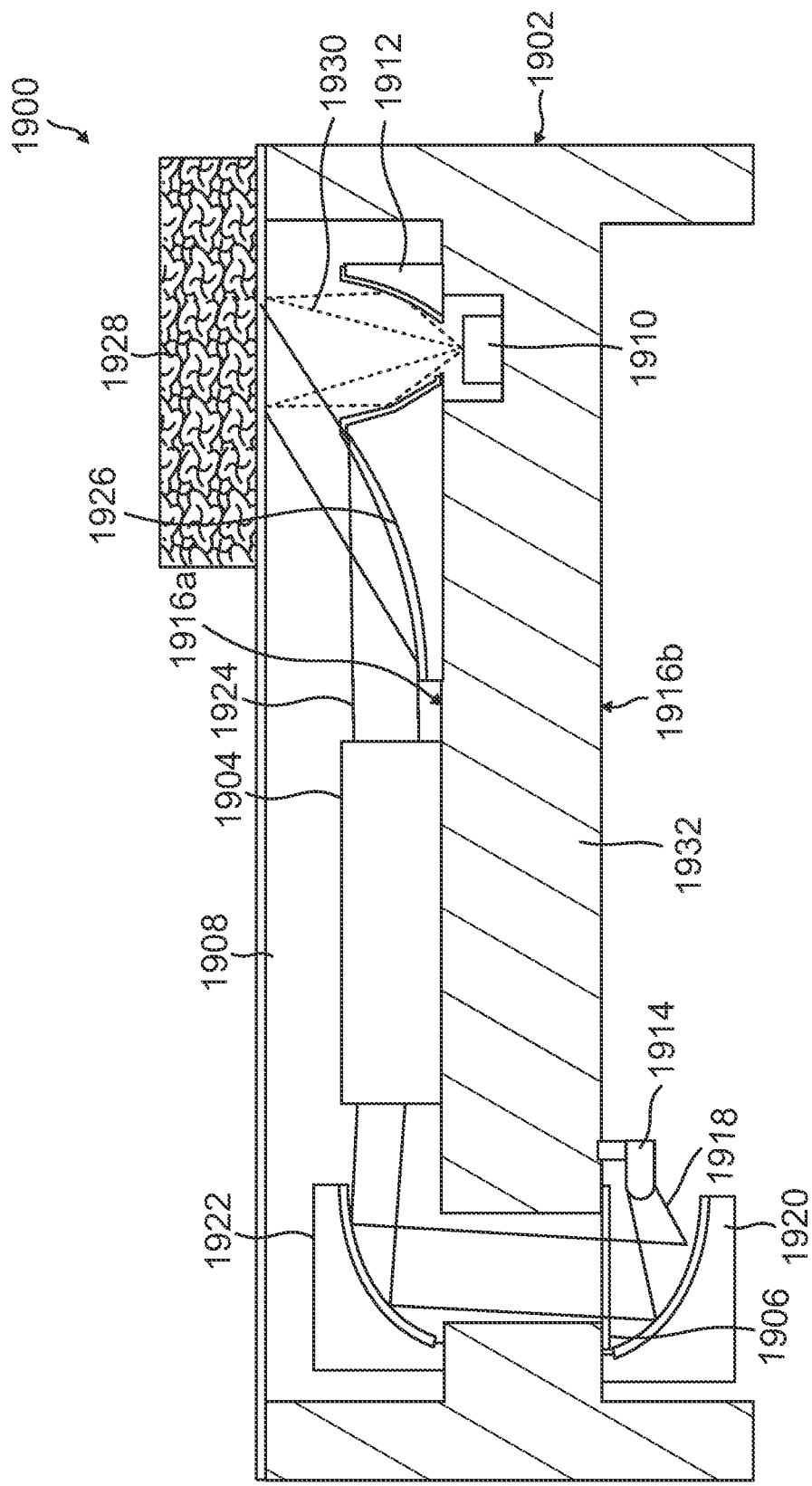
FIG. 19 is a diagram illustrating an example of a compact material analyzer device including an integrated light source according to some aspects.

FIG. 19 is a diagram illustrating an example of a compact material analyzer device 1900 including an integrated light source according to some aspects. The compact material analyzer device 1900 includes a single integrated module 1902 (e.g., a double-sided H package). The module 1902 includes a substrate 1932 having a plurality of components thereon. The substrate includes a first surface 1916*a* (e.g., a top side) and a second surface 1916*b* (e.g., a backside). The module 1902 includes a light source 1914, a first reflector 1920, and a first optical window 1906 positioned on the second surface 1916*b* of the substrate 1932. The first optical window 1906 is positioned covering an opening (e.g., aperture or hole) in the substrate 1932.

The module 1902 further includes a light modulator 1904, a detector 1910, an optical concentrating element 1912, a second reflector 1922, and a third reflector 1926 positioned on the first surface 1916*a* of the substrate 1932. The detector 1910 is positioned within a recessed portion of the first surface 1916*a* of the substrate 1932. The third reflector 1926 may be integrated with the optical concentrating element 1912.

The module 1902 further includes a second optical window 1908 on which a sample 1928 may be placed. The first optical window 1906 is positioned on a first side (e.g., corresponding to the backside 1916*b* of the substrate 1932) of the module 1902 and the second optical window 1908 is positioned on a second side of the module 1902. Although not shown, a lid may be added to the first side (e.g., bottom side) of the module 1902 for sealing. In addition, electrical connections can be formed by soldering the module (package) 1902 onto a board (e.g., a PCB) using package castellation and backside pads or epoxy.

The light source 1914 is configured to generate input light 1918 and to direct the input light 1918 to the first reflector 1920. The first reflector 1920 is configured to direct the input light 1918 through the first optical window 1906 to the second reflector 1922. The second reflector 1922 is configured to direct the input light 1918 into the light modulator 1904. The light modulator 1904 is configured to attenuate the input light 1918 and to produce modulated light 1924 based on the input light 1918. The light modulator 1904 is further configured to direct the modulated light to the third reflector 1926. The third reflector 1926 is configured to redirect the modulated light 1924 towards the sample 1928.

Thus, the modulated light 1924 reflected from the third reflector 1926 is directed through the second optical window 1908 to the sample 1928.

The modulated light 1924 interacts with the sample 1928 and the resulting scattered reflected light (e.g., output light 1930) from the sample 1928 is directed back through the second optical window 1908. The optical concentrating element 1912 is configured to collect the scattered light (e.g., output light 1930) and direct the output light 1930 into the detector 1910.

Figure 20:
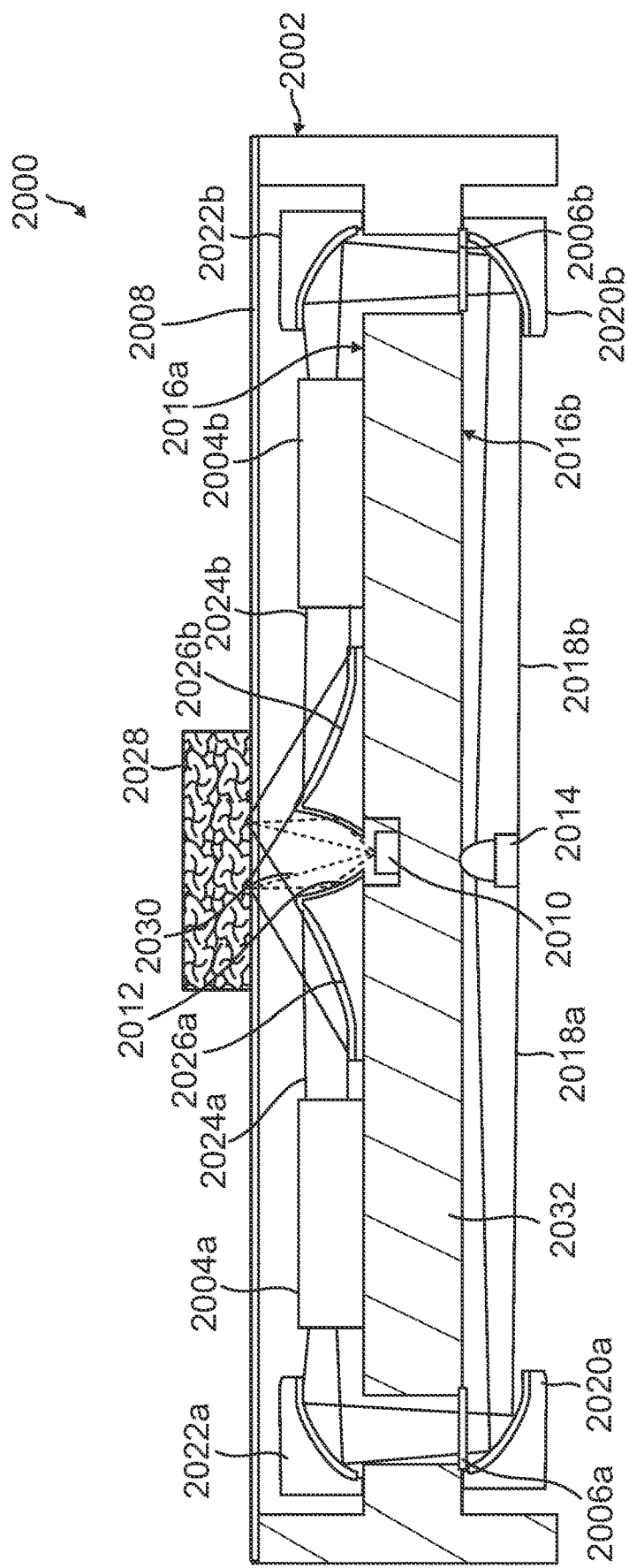
FIG. 20 is a diagram illustrating another example of a compact material analyzer device including an integrated light source according to some aspects.

FIG. 20 is a diagram illustrating another example of a compact material analyzer device 2000 including an integrated light source according to some aspects. The compact material analyzer device 2000 includes a single integrated module 2002 (e.g., a double-sided H-shaped package). The module 2002 includes a substrate 2032 having a plurality of components thereon. The substrate includes a first surface 2016a (e.g., a top side) and a second surface 2016b (e.g., a backside). The module 2002 includes a light source 2014, a first set of reflectors 2020a and 2020b, a first optical window 2006a, and a second optical window 2006b positioned on the second surface 2016b of the substrate 2032. The first optical window 2006a and second optical window 2006b are positioned covering respective openings (e.g., apertures or holes) in the substrate 2032.

The module 2002 further includes a first light modulator 2004a, a second light modulator 2004b, a detector 2010, an optical concentrating element 2012, a second set of reflectors 2022a and 2022b, and a third set of reflectors 2026a and 2026b positioned on the first surface 2016a of the substrate 2032. The detector 2010 is positioned within a recessed portion of the first surface 2016a of the substrate 2032. The third set of reflectors 2026a and 2026b may be curved reflectors surrounding the optical concentrating element 2012.

The module 2002 further includes a third optical window 2008 on which a sample 2028 may be placed. The first and second optical windows 2006a and 2006b are positioned on a first side (e.g., corresponding to the backside 2016b of the substrate 2032) of the module 2002 and the third optical window 2008 is positioned on a second side of the module 2002. Although not shown, a lid may be added to the first side (e.g., bottom side) of the module 2002 for sealing.

The light source 2014 is configured to generate and emit input light 2018a and 2018b in multiple directions. The first set of reflectors 2020a and 2020b are configured to direct the respective input light 2018a and 2018b through the first optical window 2006a and the second optical window 2006b, respectively, to the second set of reflectors 2022a and 2022b. The second set of reflectors 2022a and 2022b are configured to redirect the respective input light 2018a and 2018b towards a respective light modulator 2004a and 2004b. Thus, the reflector 2022a directs the input light 2018a to the first light modulator 2004a and the reflector 2022b directs the input light 2018b to the second light modulator 2004b. Each light modulator 2004a and 2004b is configured to attenuate the respective input light 2018a and 2018b and produce respective modulated light 2024a and 2024b based on the respective input light 2018a and 2018b. The light modulators 2004a and 2004b are further configured to direct the respective modulated light 2024a and 2024b to the second set of reflectors 2026a and 2026b. The second set of reflectors 2026a and 2026b redirect the modulated light 2024a and 2024b towards the sample 2028. Thus, the modulated light 2024a and 2024b reflected from the second set of reflectors 2026a and 2026b is directed through the third optical window 2008 to the sample 2028.

The modulated light 2024a and 2024b interacts with the sample 2028 and the resulting scattered reflected light (e.g., output light 2030) from the sample 2028 is directed back through the third optical window 2008. The optical concentrating element 2012 is configured to collect the scattered light (e.g., output light 2030) and direct the output light 2030 into the detector 2010. As in the example shown in FIGS. 16 and 17, the detector 2010 collects the superposition of the two reflected modulated light beams 2024a and 2024b (e.g., interference patterns), thus doubling the signal-to-noise ratio.

Figure 21:
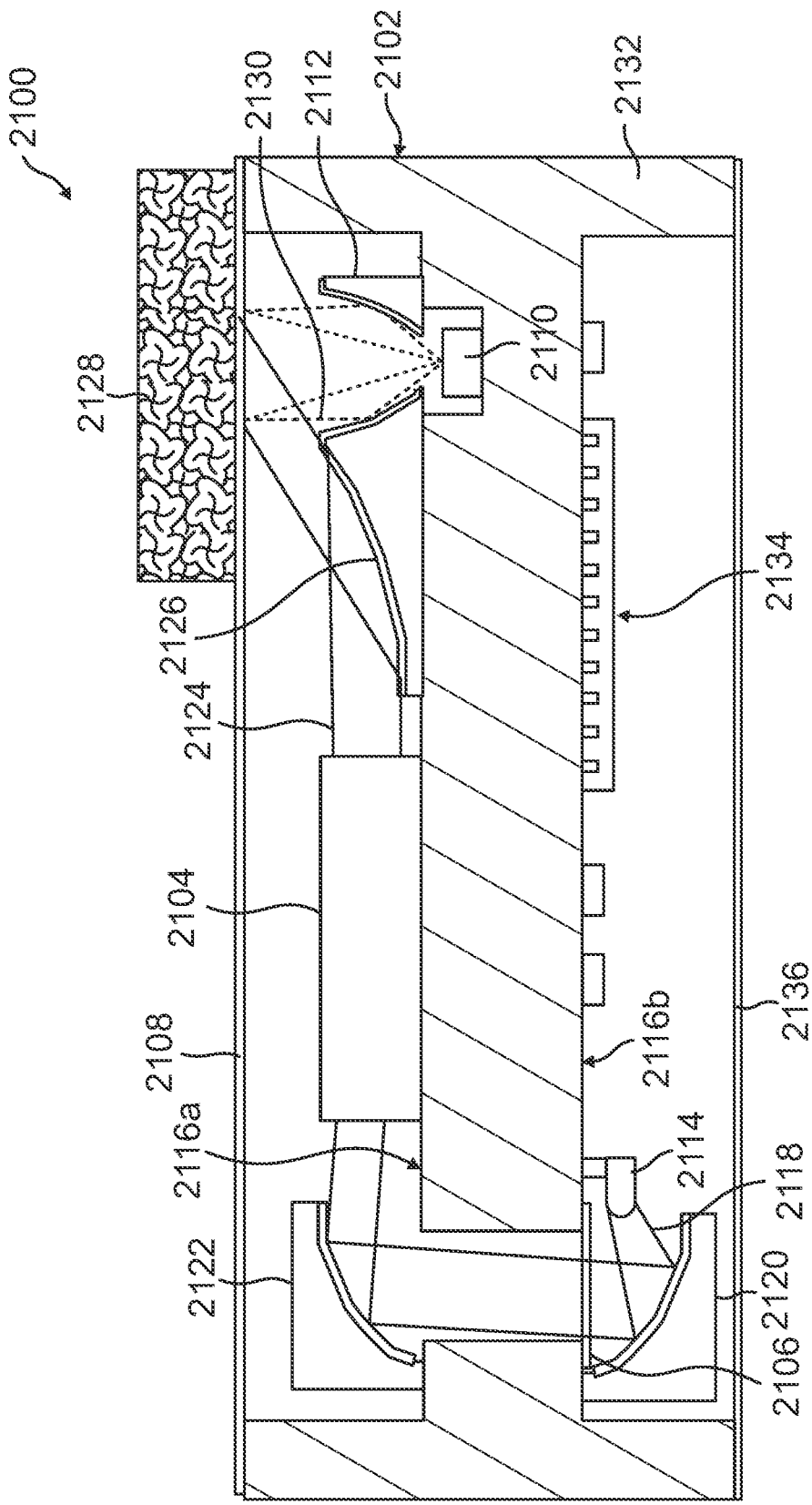
FIG. 21 is a diagram illustrating another example of a compact material analyzer device including an integrated light source according to some aspects.

FIG. 21 is a diagram illustrating another example of a compact material analyzer device 2100 including an integrated light source according to some aspects. The compact material analyzer device 2100 includes a single integrated module 2102 (e.g., a double-sided H package). The module 2102 includes a substrate 2132 having a plurality of components thereon. The substrate includes a first surface 2116a (e.g., a top side) and a second surface 2116b (e.g., a backside). The module 2102 includes a light source 2114, a first reflector 2120, and a first optical window 2106 positioned on the second surface 2116b of the substrate 2132. The first optical window 2106 is positioned covering an opening (e.g., aperture or hole) in the substrate 2132. In addition, the module 2102 includes controlling electronics 2134 (e.g., an ASIC and other electronics) assembled on the second surface 2116b (e.g., backside) of the substrate 2132.

The module 2102 further includes a light modulator 2104, a detector 2110, an optical concentrating element 2112, a second reflector 2122, and a third reflector 2126 positioned on the first surface 2116a of the substrate 2132. The detector 2110 is positioned within a recessed portion of the first surface 2116a of the substrate 2132. The third reflector 2126 may be integrated with the optical concentrating element 2112.

The module 2102 further includes a second optical window 2108 on which a sample 2128 may be placed. The first optical window 2106 is positioned on a first side (e.g., corresponding to the backside 2116b of the substrate 2132) of the module 2102 and the second optical window 2108 is positioned on a second side of the module 2102. The module 2102 may further include a lid 2136 (e.g., glass lid) on the first side (e.g., bottom side) for sealing. In addition, electrical connections can be formed by soldering the module (package) 2102 onto a board (e.g., a PCB) using package castellation and backside pads or epoxy.

The light source 2114 is configured to generate input light 2118 and to direct the input light 2118 to the first reflector 2120. The first reflector 2120 is configured to direct the input light 2118 through the first optical window 2106 to the second reflector 2122. The second reflector 2122 is configured to direct the input light 2118 into the light modulator 2104. The light modulator 2104 is configured to attenuate the input light 2118 and to produce modulated light 2124 based on the input light 2118. The light modulator 2104 is further configured to direct the modulated light to the third reflector 2126. The third reflector 2126 is configured to redirect the modulated light 2124 towards the sample 2128. Thus, the modulated light 2124 reflected from the third reflector 2126 is directed through the second optical window 2108 to the sample 2128.

The modulated light 2124 interacts with the sample 2128 and the resulting scattered reflected light (e.g., output light 2130) from the sample 2128 is directed back through the second optical window 2108. The optical concentrating element 2112 is configured to collect the scattered light (e.g., output light 2130) and direct the output light 2130 into the detector 2110.

Figure 22:
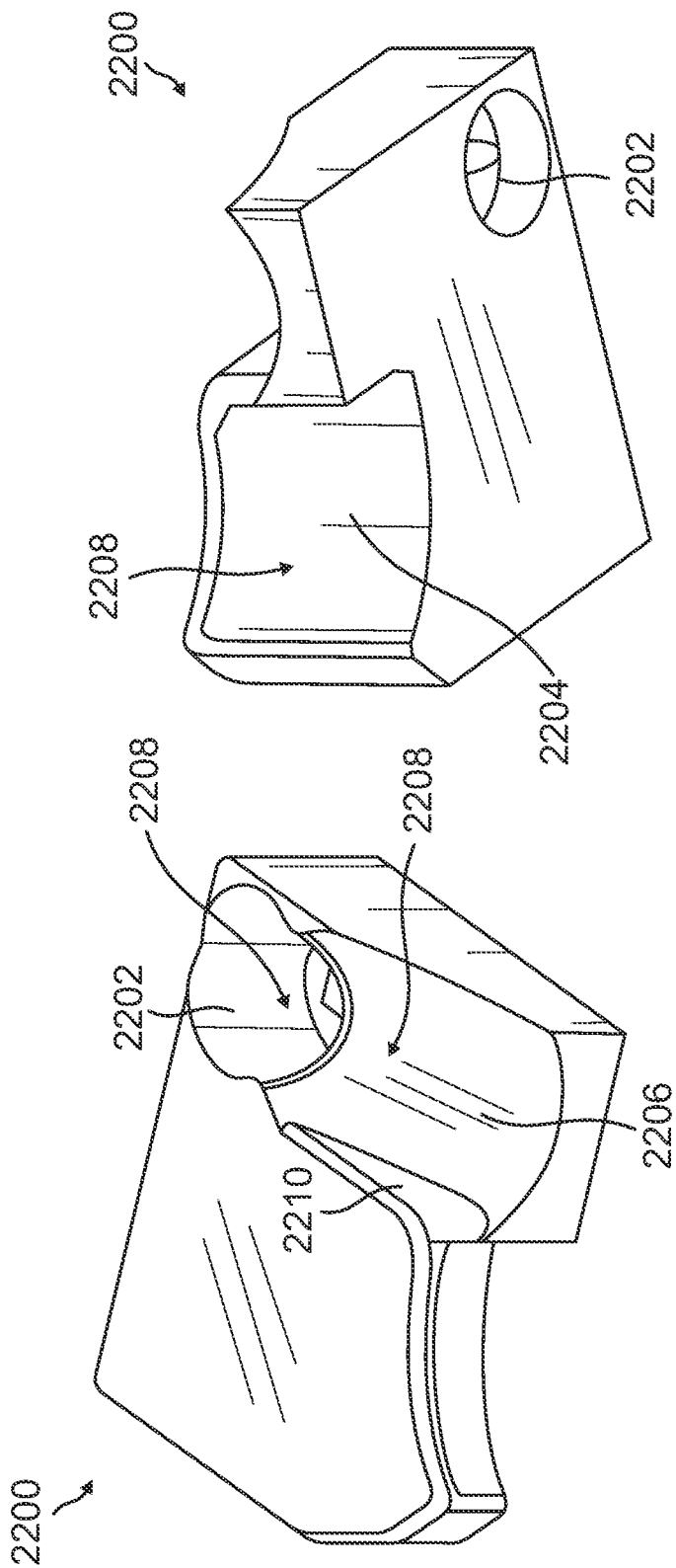
FIGS. 22A and 22B are diagrams illustrating an example of a light coupling device according to some aspects.

FIGS. 22A and 22B are diagrams illustrating an example of a light coupling device 2200 according to some aspects. The light coupling device 2200 includes an optical concentrating element 2202, a first reflector 2204, and a second reflector 2206. The optical concentrating element 2202 and reflectors 2204 and 2206 may correspond, for example, to the optical concentrating element and reflectors for a single light modulator and corresponding single detector shown and described above in connection with any of FIGS. 5, 7-9, 13-16, and/or 18-21.

The light coupling device 2200 shown in FIGS. 22A and 22B may be formed of a single opto-mechanical piece of material to ensure accurate alignment of the optical concentrating element 2202, the first reflector 2204, and the second reflector 2206. The core material of the light coupling device 2200 may be, for example, metallic or moldable plastic. The light coupling device 2200 may be fabricated, for example, by three-dimensional printing, optical stereo lithography, precision injection molding, or other suitable fabrication process. The surface reflectivity of the light coupling device 2200 may be enhanced by including a coating of a thin film layer 2208 on the optical interfaces (e.g., the optical concentrating element 2202, the first reflector 2204, and the second reflector 2206). In addition, the light coupling device 2200 may include absorbing walls 2210 designed to block stray light from passing from one reflective surface (e.g., the optical concentrating element 2202, the first reflector 2204, or the second reflector 2206) to another reflective surface.

Figure 23:
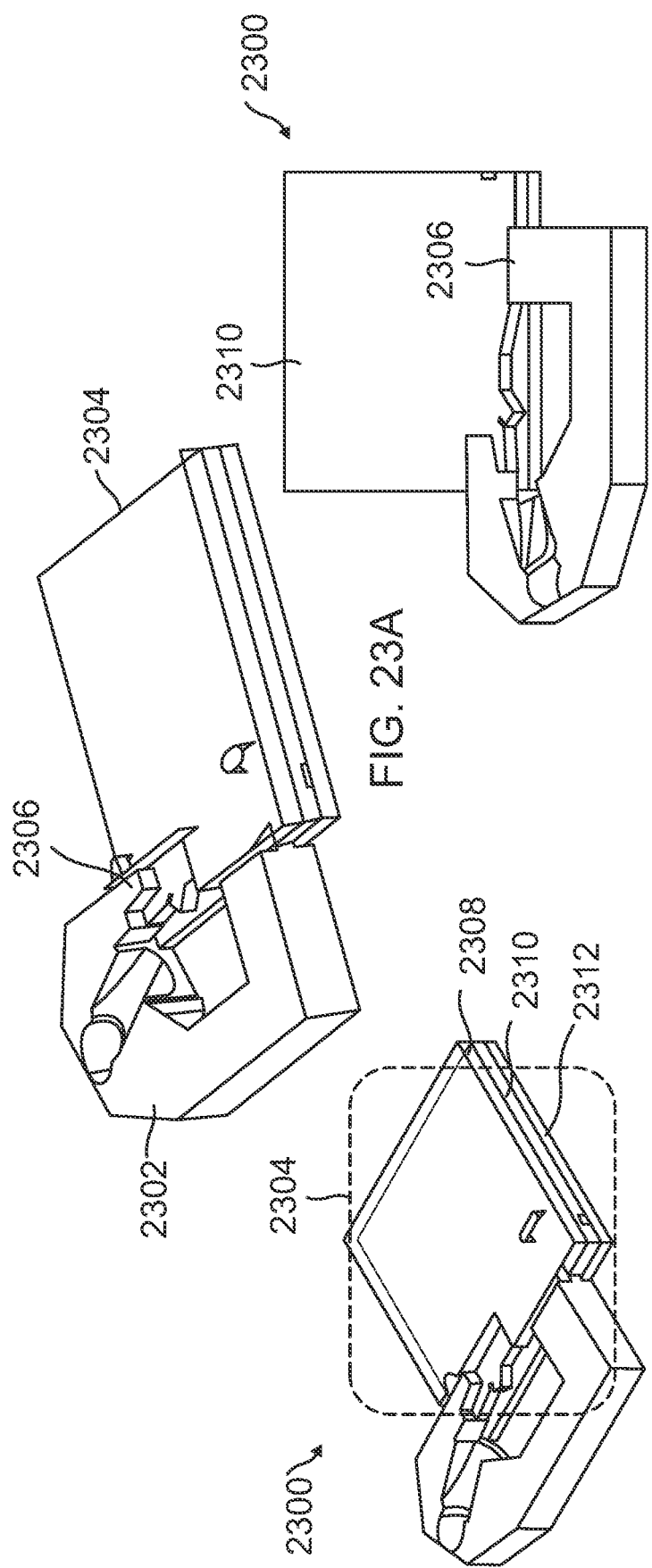
FIGS. 23A-23C are diagrams illustrating an example of a compact material analyzer device including a light coupling device and a light modulator according to some aspects.

FIGS. 23A-23C are diagrams illustrating an example of a compact material analyzer device 2300 including a light coupling device 2302 and a light modulator 2304 according to some aspects. FIGS. 23A-23C are top tilted views of the compact material analyzer device 2300.

The light coupling device 2302 includes optical alignment features (e.g., alignment fingers) 2306 for passive alignment with the light modulator 2304 (e.g., MEMS chip). The alignment fingers 2306 further facilitate direct insertion of the light coupling device into the light modulator 2304. In some examples, complementary alignment features (not shown) on the light modulator 2304 may be used in conjunction with the optical alignment fingers 2306 in a male-female manner. The alignment features on the light coupling device 2302 and light modulator 2304 may be distributed across the devices to minimize alignment errors.

In examples in which the light modulator 2304 is fabricated on a SOI substrate including a device layer 2310 and a handle layer 2312 with a glass window (e.g., optical window) on which a sample may be placed, the alignment features may be formed in the device layer 2310 of the SOI substrate. In some examples, the alignment fingers 2306 may be based on the mechanical shape of one or more optical parts (e.g., one or more mirrors) in the light modulator 2304. By integrating the light coupling device 2302 with the MEMS chip (light modulator 2304), miniaturized material analyzer devices with most components on-chip may be manufactured. For example, such a miniaturized material analyzer device may be implemented as a wearable product.

Figure 24:
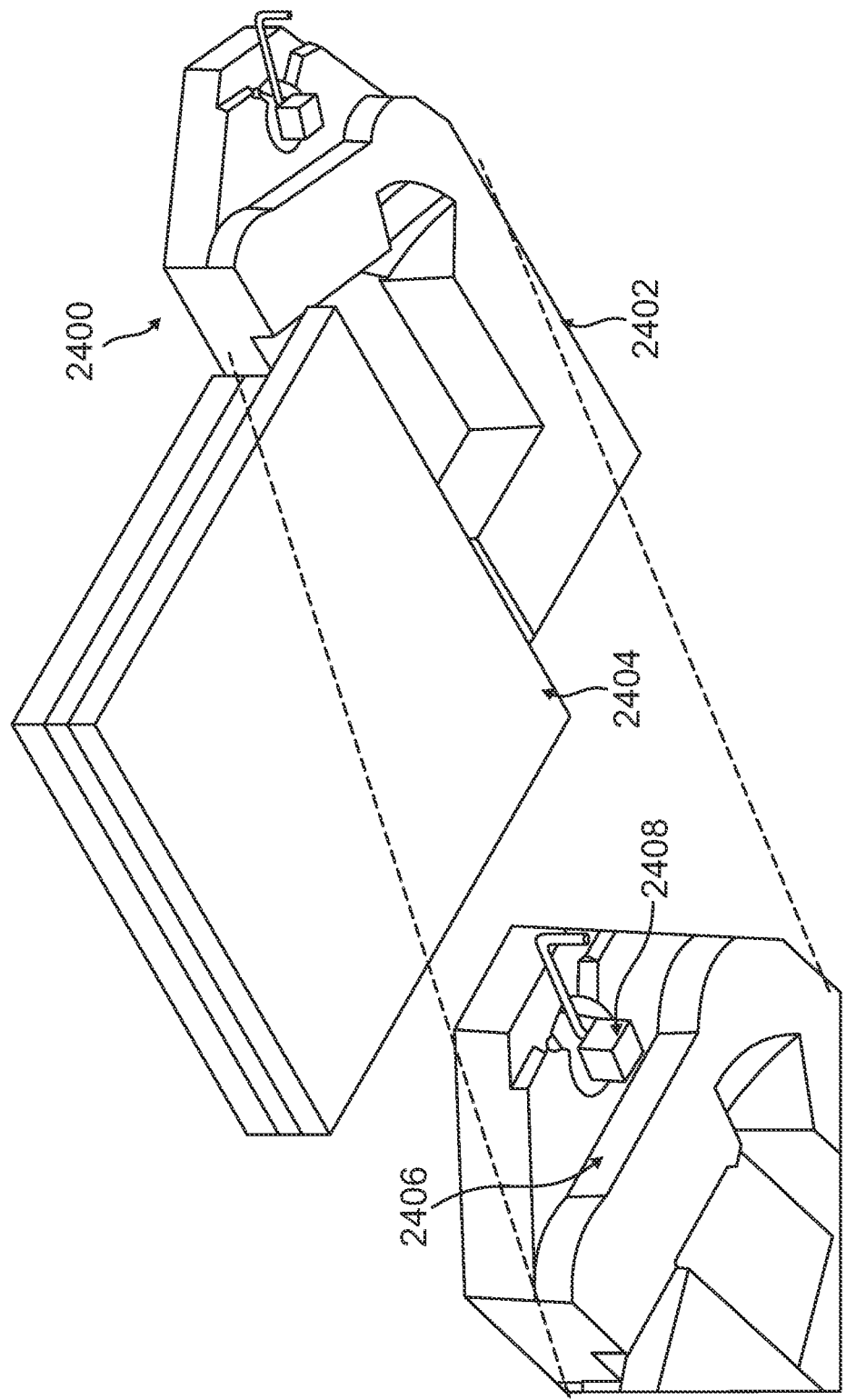
FIG. 24 is a diagram illustrating another example of a compact material analyzer device including a light coupling device and a light modulator according to some aspects.

FIG. 24 is a diagram illustrating another example of a compact material analyzer device 2400 including a light coupling device 2402 and a light modulator 2404 according to some aspects. FIG. 24 is a bottom tilted view of the compact material analyzer device 2400 in which a detector 2408 is visible. In some examples, the light coupling device 2402 may include openings to allow access to the detector 2408 during the assembly process. In addition, the light coupling device 2402 further includes an electromagnetic shielding wall 2406 that is configured to prevent direct electromagnetic coupling between the detector 2408 and the light modulator 2404. In some examples, the electromagnetic shielding wall 2406 may be metal or plastic with a thick metal coating.

Figure 25:
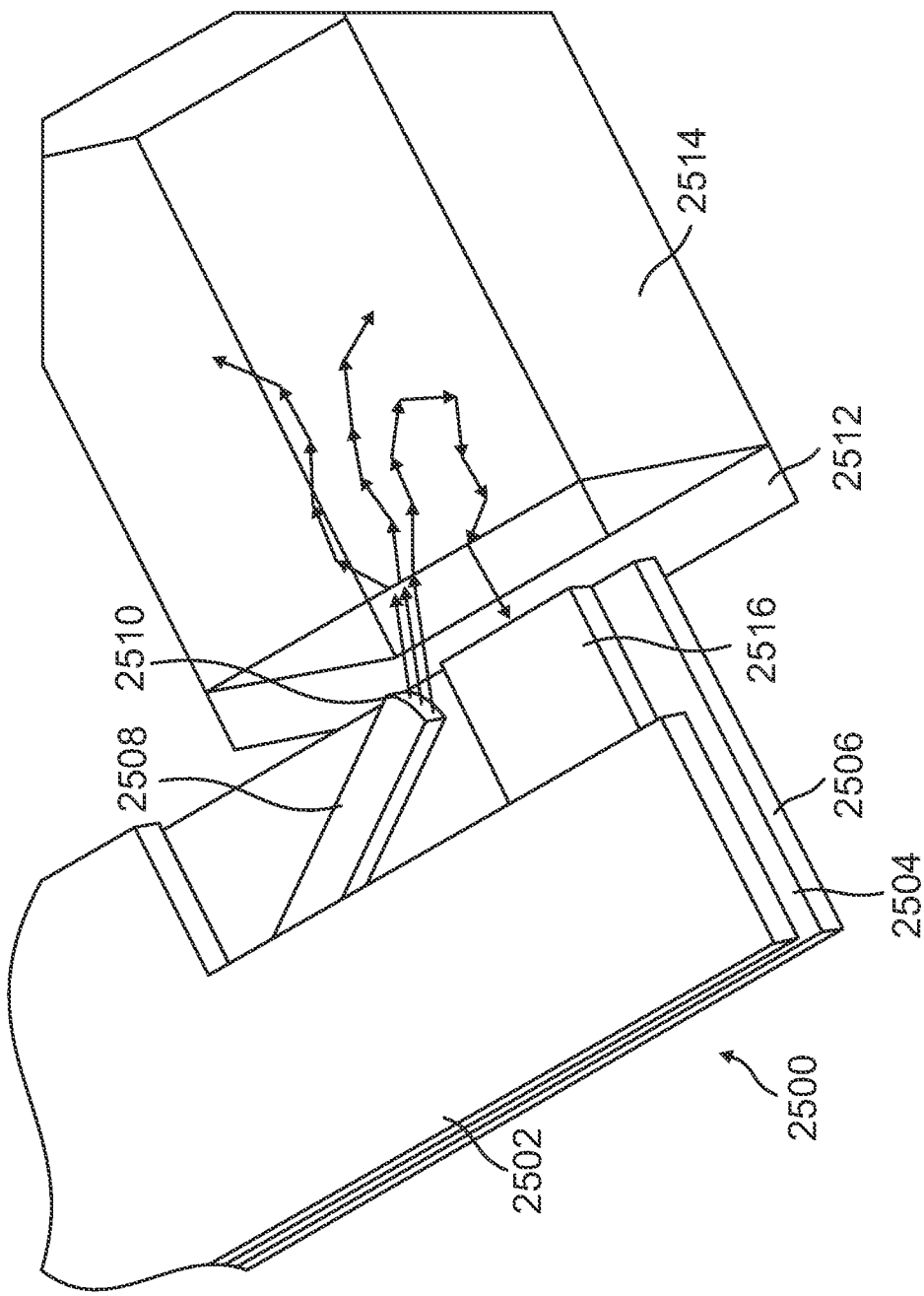
FIG. 25 is a diagram illustrating an example of a compact material analyzer device including optical waveguides according to some aspects.

FIG. 25 is a diagram illustrating an example of a compact material analyzer device 2500 including optical waveguides according to some aspects. In the example shown in FIG. 25, the compact material analyzer device 2500 is a single MEMS chip fabricated in a device layer 2504 of an SOI substrate including the device layer and a handle layer 2506. The MEMS chip includes an optical interferometer (not shown), an illumination waveguide 2508 having a waveguide interface 2510 to carry the modulated light to a sample 2514 (e.g., skin tissue), and a collection waveguide 2516 to collect the output light scattered from the sample 2514 and guide the output light to a detector (not shown). The MEMS chip 2500 is further packaged for protection using machined glass 2502 on the top and a glass window 2512 on the sides thereof. The glass window 2512 may further function as an interface between the waveguides 2508 and 2516 and the sample 2514.

Figure 26:
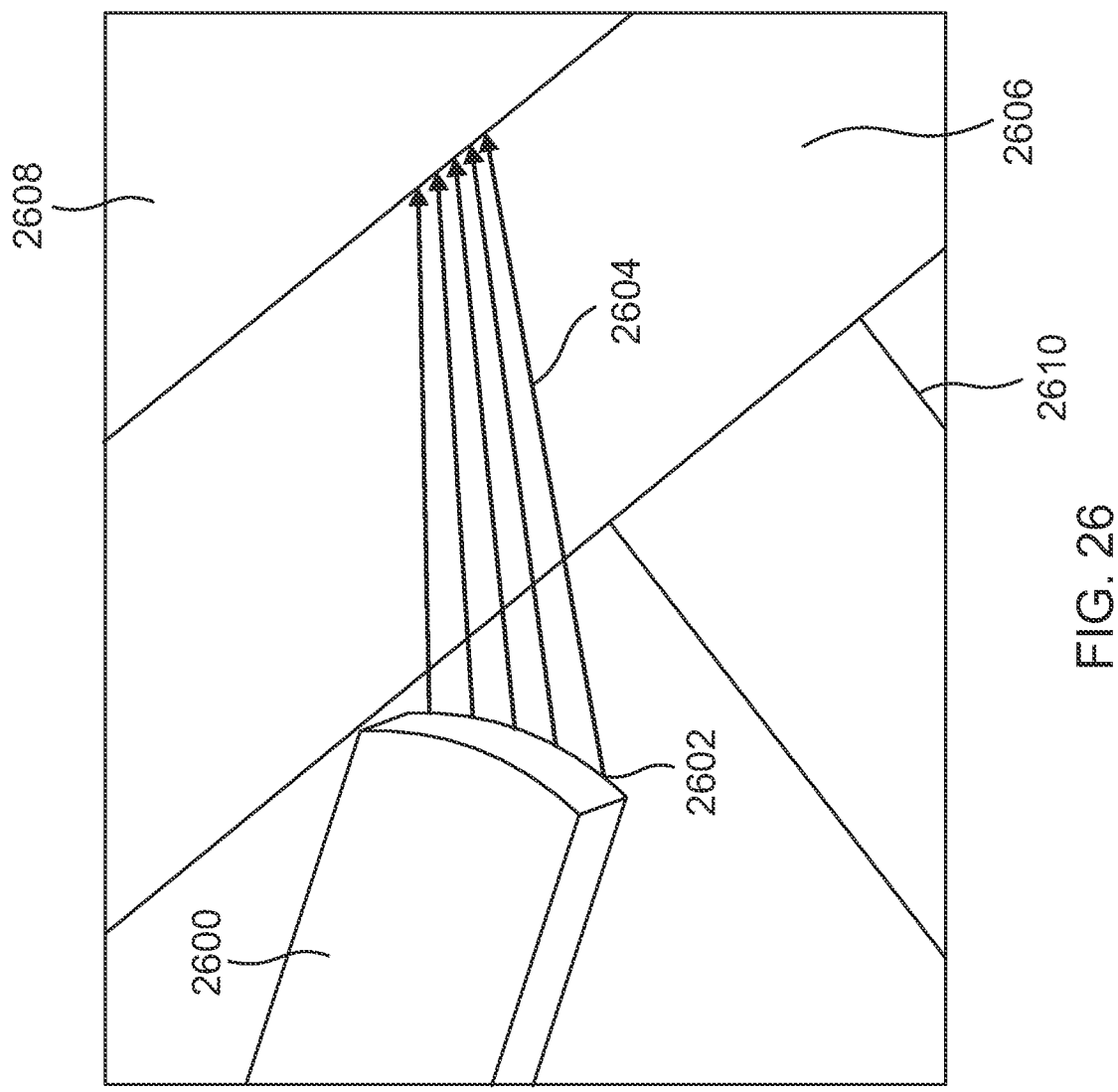
FIG. 26 is a diagram illustrating an example of an optical waveguide according to some aspects.

FIG. 26 is a diagram illustrating an example of an optical waveguide 2600 according to some aspects. The optical waveguide 2600 shown in FIG. 26 is an illumination waveguide and may correspond, for example, to the illumination waveguide 2508 shown in FIG. 25. The illumination waveguide 2600 is configured to guide modulated light through an optical window 2606 to a sample under test 2608 (e.g., skin). In the example shown in FIG. 26, the illumination waveguide 2600 includes a waveguide interface 2602 configured to steer the modulated light using, for example, refraction. In some examples, the steering angle of the waveguide interface 2602 is less than the critical angle between silicon and air to maintain the optical power of the modulated light. If the steering angle is larger than the critical angle, this may result in the total internal reflection of the modulated light inside the waveguide, which may reduce the optical power. In addition, to control the spot size on the sample 2608, the waveguide interface 2602 may have a curved shape (e.g., a curved waveguide interface) to produce a lensing effect.

Figure 27:
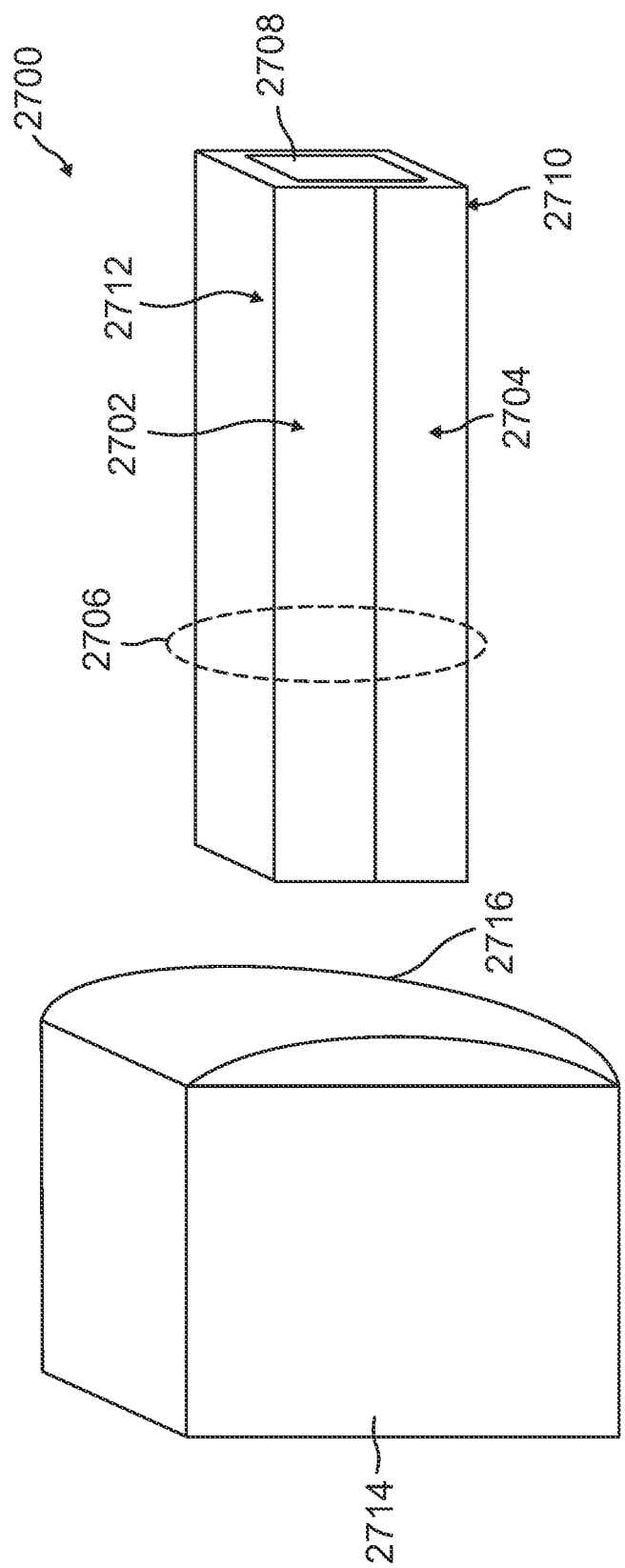
FIG. 27 is a diagram illustrating an example of an optical waveguide according to some aspects.

FIG. 27 is a diagram illustrating an example of an optical waveguide 2700 according to some aspects. The optical waveguide 2700 shown in FIG. 27 is a collection waveguide and may correspond, for example, to the collection waveguide 2516 shown in FIG. 25. The collection waveguide 2700 includes an upper collection waveguide 2702 and a lower collection waveguide 2704 parallel to the upper collection waveguide 2702 to increase the throughput of the optical system. In an example, the collection waveguide 2700 may be fabricated in a substrate 2706 (e.g., a buried oxide (BOX) substrate, such as an SOI substrate). For example, the collection waveguide 2700 may be fabricated in the BOX substrate 2706 of the MEMS chip. Here, the upper collection waveguide 2702 is fabricated (etched) in a device layer 2712 of the substrate 2706 and the lower collection waveguide 2704 is fabricated (etched) in a handle layer 2710 of the substrate 2706 with a gap between the upper and lower waveguides 2702 and 2704 resulting from the release of the oxide layer in the MEMS chip. This results in the use of two waveguides 2702 and 2704 for enhanced coupling of the output light to a detector 2708.

In addition, to facilitate the direct collection of the scattered light (output light) from a sample 2714 into the collection waveguide 2700, the collection waveguide 2700 may be placed in the closest possible proximity to the sample 2714. The minimum distance between the sample 2714 and the collection waveguide 2700 is bounded by an optical window (glass window) 2716 that is directly in contact with the sample 2714. To further increase power coupling to the detector 2708, the optical window 2716 may be curved to create a lensed optical window. The lensed optical window 2716 may reduce the divergence losses by redirecting some of the escaping rays to the input of the collection waveguide 2700. The optical waveguide configurations shown in FIGS. 25-27 offer a compact, integrated, and cost-effective solution that enables the use of MEMS technology with wearable devices for measuring non-invasively from a sample (e.g., skin) with high coupling efficiency.

Figure 28B:
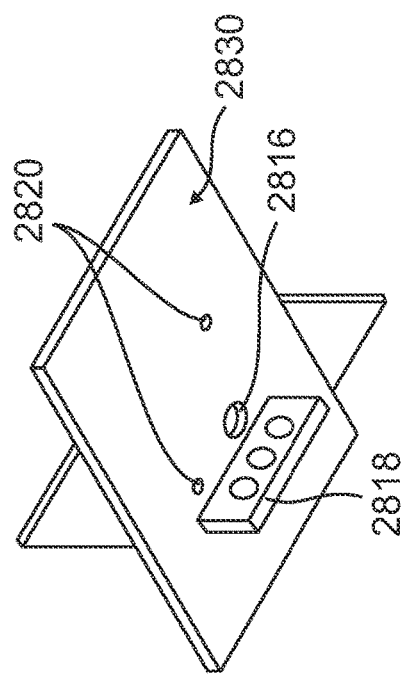
FIGS. 28A-28C are diagrams illustrating an example of an integrated material analyzer device using a frame according to some aspects.
Figure 28C:
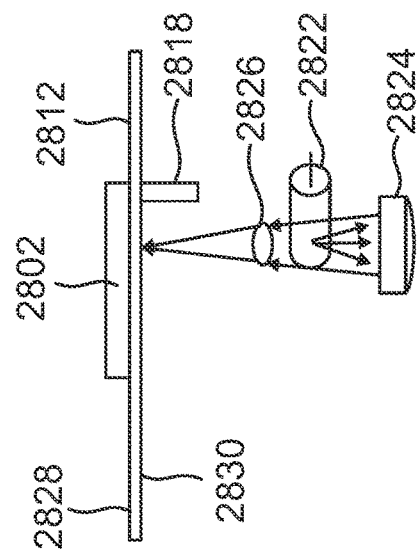
Figure 28A:
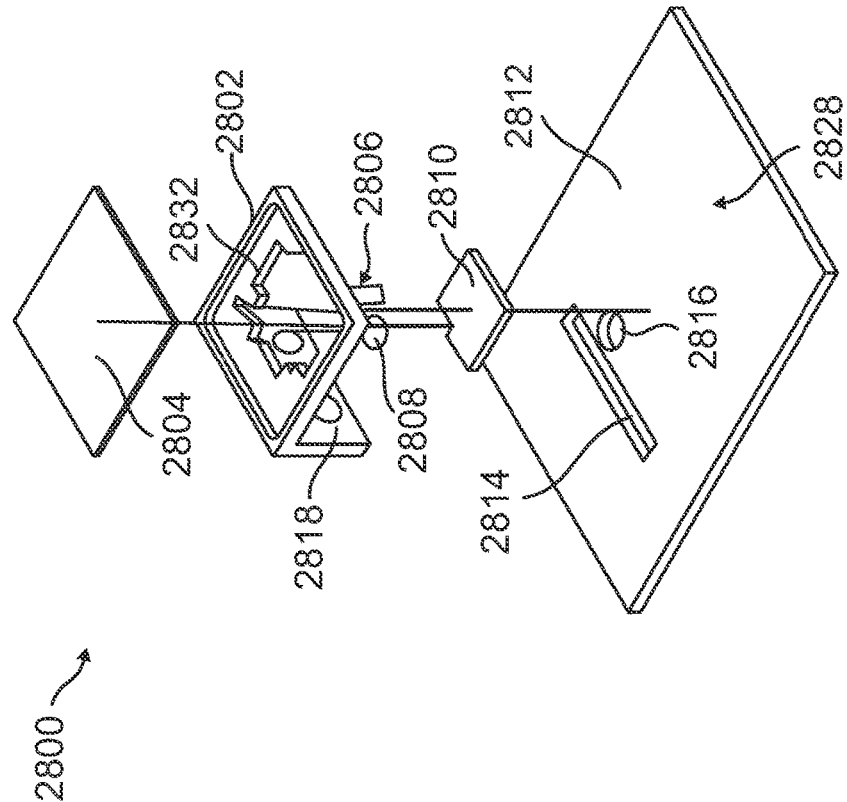

FIGS. 28A-28C are diagrams illustrating an example of an integrated material analyzer device 2800 using a frame 2802 according to some aspects. The integrated material analyzer device 2800 shown in FIGS. 28A-28C provides a solution for integrating chips/components on board, while reducing the cost and removing the need of active alignment. The frame 2802 may be, for example, an optical mold. The frame 2802 includes features configured to facilitate insertion, fixation, and alignment of a detector 2806 and a light modulator (e.g., MEMS chip) 2810. For example, the frame 2802 may include openings having a size and shape configured to physically accommodate the detector 2806, the MEMS chip 2810, and any electrical connections, such as wire bonding. In addition, the frame 2802 includes an opening 2832 configured to facilitate insertion and fixation of a second optical window 2804 (e.g., a top glass window). The frame 2802 may further include an additional opening (not shown) for insertion and fixation of a first optical window 2808 (e.g., bottom glass window). In some examples, a light coupling device, such as the light coupling device shown in FIGS. 22A and 22B, can be formed in the frame 2802 to guarantee self-alignment and reduce the cost.

The frame 2802 also contains additional features for injection into holes in a board 2812 (e.g., PCB) for each of assembly and alignment. For example, the frame 2802 can include a protruded alignment part 2818 extending from a side of the frame and a plurality of alignment pins 2820 for aligning the frame 2802 on the PCB 2812. The PCB 2812 includes an opening 2814 (e.g., a hole) configured to receive the protruded alignment part 2818 and a plurality of alignment holes 2832 configured to receive the plurality of alignment pins 2820. In addition, the PCB 2812 includes a hole 2816 aligned with the bottom glass window 2808. The frame 2802 may be assembled on a first surface 2828 (e.g., top side) of the PCB 2812 and the protruded alignment part 2818 may be inserted through the opening 2814 to a second surface 2830 (e.g., a backside) of the PCB 2812. In addition, a light source 2822, reflector 2824, and lens 2826 may be integrated on the second surface 2830 of the PCB 2812 to direct input light through the hole 2816 and bottom glass window 2808 to the MEMS chip 2810.

FIGS. 29A-29C are diagrams illustrating an example of an integrated material analyzer device 2900 using a metal substrate 2902 according to some aspects. The metal substrate 2902 with accurate machining can be used for accurate placement of the various components of the material analyzer device 2900. In particular, the metal substrate 2902 can include alignment features configured to align a light modulator 2906 (e.g., MEMS chip), detector 2930, a first optical window 2932 (e.g., bottom glass window), and a light coupling device 2910. For example, the metal substrate 2902 can include machine openings as alignment marks and openings for injecting the light coupling device 2910, placing the MEMS chip 2906, the detector 2930, and the bottom glass window 2932, and allowing the electrical connection of wire bonds to the various components. A frame 2904 can be inserted on (attached to) the metal substrate 2902. The frame 2904 can include an opening 2928 configured to receive a second optical window 2908 (e.g., top glass window).

The metal substrate 2902 can be attached to a first surface 2924 (e.g., top side) of a board 2912 (e.g., PCB). The PCB 2912 includes an opening 2916 (e.g., a hole) aligned with the bottom glass window 2932. In addition, a light source 2918, reflector 2920, and lens 2922 may be integrated on (attached to) a second surface 2926 (e.g., backside) of the PCB 2912 to direct input light through the hole 2916 and bottom glass window 2932 to the MEMS chip 2906.

The following provides an overview of examples of the present disclosure.

Example 1: A compact material analyzer device, comprising: a light source configured to generate input light; a module comprising a first optical window on a first side of the module, a second optical window on a second side of the module opposite the first side and a light modulator, the light modulator configured to receive the input light from the light source through the first optical window, attenuate the input light, and produce modulated light based on the input light, the light modulator being further configured to direct the modulated light through the second optical window to a sample; and a detector configured to receive output light from the sample produced from interaction with the modulated light through the second optical window and to detect a spectrum of the output light.

Example 2: The compact material analyzer device of example 1, wherein the module comprises a first substrate including a first surface and a second surface, the light modulator being positioned on the first surface of the first substrate.

Example 3: The compact material analyzer device of example 2, further comprising: a printed circuit board having the module positioned on a top surface thereof and comprising a hole configured to couple light from the light source into the module.

Example 4: The compact material analyzer device of example 3, wherein the first substrate comprises an interposer, the first substrate being attached to the printed circuit board.

Example 5: The compact material analyzer device of any of examples 2 through 4, wherein the first optical window is positioned on the second surface of the first substrate.

Example 6: The compact material analyzer device of example 5, wherein the light source is positioned on the second surface of the first substrate, and wherein the module further comprises: a first reflector; and a second reflector, the first reflector configured to receive the input light from the light source and to direct the input light through the first optical window to the second reflector, the second reflector configured to direct the input light to the light modulator.

Example 7: The compact material analyzer device of example 6, wherein the module further comprises: a third optical window; an additional light modulator; a third reflector; and a fourth reflector, wherein the third reflector is configured to receive the input light from the light source and to direct the input light through the third optical window to the fourth reflector, the fourth reflector configured to direct the input light to the additional light modulator the additional light modulator further configured to produce additional modulated light based on the input light and to direct the additional modulated light through the second optical window to the sample to produce additional output light from interaction with the additional modulated light directed to the detector.

Example 8: The compact material analyzer device of any of examples 2 through 7, wherein the first substrate comprises an opening, the first optical window covering the opening.

Example 9: The compact material analyzer device of any of examples 2 through 5, further comprising: a source module comprising a second substrate and the light source, wherein the light source is positioned on the second substrate.

Example 10: The compact material analyzer device of example 9, further comprising: a light detection module comprising a third optical window, a third substrate and the detector, wherein the detector is positioned on the third substrate and configured to receive the output light from the sample through the third optical window.

Example 11: The compact material analyzer device of example 10, wherein the light detection module further comprises a lens on the third optical window.

Example 12: The compact material analyzer device of any of examples 2 through 9, wherein the detector is positioned on the first surface of the first substrate and is configured to receive the output light from the sample through the second optical window.

Example 13: The compact material analyzer device of any of examples 1 through 9 or 12, further comprising: a reflector positioned adjacent the sample and opposite the second optical window and configured to reflect the output light from the sample back to the sample to direct the output light to the detector.

Example 14: The compact material analyzer device of any of examples 1 through 13, further comprising: an optical concentrating element configured to collect the output light from the sample and to reflect the output light to the detector.

Example 15: The compact material analyzer device of example 14, wherein the optical concentrating element is a compound optical concentrating element comprising an inner optical concentrating element having a first depth and an outer optical concentrating element having a second depth less than the first depth, wherein the outer optical concentrating element is configured to reflect the output light back to the sample to produce additional output light collected by the inner optical concentrating element for reflection to the detector.

Example 16: The compact material analyzer device of example 15, wherein the outer optical concentrating element comprises a ring shape.

Example 17: The compact material analyzer device of any of examples 14 through 16, wherein the detector comprises a first detector and a second detector and the optical concentrating element comprises a first optical concentrating element configured to direct a first portion of the output light to the first detector and a second optical concentrating element configured to direct a second portion the output light to the second detector.

Example 18: The compact material analyzer device of example 17, wherein the first portion of the output light is received from a first spatial location on the sample and the second portion of the output light is received from a second spatial location on the sample.

Example 19: The compact material analyzer device of example 17, wherein the first portion of the output light comprises a first wavelength range and the second portion of the output light comprises a second wavelength range different than the first wavelength range.

Example 20: The compact material analyzer device of any of examples 1 through 19, wherein the module further comprises: a first optical element configured to receive the input light and to direct the input light to the light modulator; and a second optical element configured to receive the modulated light and to direct the modulated light through the second optical window to the sample.

Example 21: The compact material analyzer device of example 20, wherein the module further comprises an optical element positioned on or formed within the second optical window and configured to direct the modulated light from the second optical element to the sample.

Example 22: The compact material analyzer device of example 20 or 21, further comprising: a light coupling device comprising the first reflector, the second reflector, and an optical concentrating element configured to collect the output light from the sample and to reflect the output light to the detector, wherein the light coupling device is formed of a single piece of material.

Example 23: The compact material analyzer device of example 22, wherein the light coupling device comprises at least one mechanical alignment feature configured to optically align the light coupling device with the light modulator.

Example 24: The compact material analyzer device of example 22 or 23, wherein the light coupling device comprises an electromagnetic shielding wall configured to prevent direct electromagnetic coupling between the detector and the light modulator.

Example 25: The compact material analyzer device of any of examples 1 through 5 or 8 through 24, wherein the module further comprises an additional light modulator configured to receive the input light from the light source, the additional light modulator further configured to produce additional modulated light based on the input light and to direct the additional modulated light through the second optical window to the sample to produce additional output light from interaction with the additional modulated light directed to the detector.

Example 26: The compact material analyzer device of example 25, wherein the module further comprises a third optical window on the first side of the module and the additional light modulator is configured to receive the input light from the light source via the third optical window.

Example 27: The compact material analyzer device of any of examples 1 through 5, or 8 through 24, wherein the light modulator comprises a Mach Zehnder interferometer configured to produce the modulated light and additional modulated light, each directed to a different spatial location on the sample, and further comprising: an additional detector configured to receive additional output light from the sample produced from interaction with the additional modulated light and to detect an additional spectrum of the additional output light.

Example 28: The compact material analyzer device of any of examples 1 through 5, 8, 9, 12, 13, or 20 through 27, further comprising: an illumination waveguide configured to guide the modulated light to the sample; and a collection waveguide configured to guide the output light to the detector.

Example 29: The compact material analyzer device of example 28, wherein the illumination waveguide comprises a curved waveguide interface.

Example 30: The compact material analyzer device of example 28 or 29, wherein: the second optical window comprises a lens configured to couple the output light to the collection waveguide; the light modulator is formed in a substrate comprising a device layer, an oxide layer, and a handle layer, and the collection waveguide comprises a first collection waveguide formed in the device layer and a second collection waveguide formed in the handle layer, the first collection waveguide and the second collection waveguide being parallel.

Example 31: The compact material analyzer device of example 1, wherein the module comprises a frame, the frame comprising respective features configured to facilitate insertion and alignment of the light modulator and the detector, the frame further comprising a first opening configured to facilitate insertion of the second optical window, a protruded alignment part extending from a side of the frame, and a plurality of alignment pins, and wherein the material analyzer device further comprises: a printed circuit board comprising a second opening configured to receive the protruded alignment part, a plurality of alignment holes configured to receive the plurality of alignment pins, and a hole aligned with the second optical window.

Example 32: The compact material analyzer device of example 31, wherein the light source is integrated on a backside of the printed circuit board.

Example 33: The compact material analyzer device of example 1, wherein the module comprises: a metal substrate comprising alignment features configured to align the light modulator, the detector, and the first optical window on the metal substrate; and a frame attached to the metal substrate and comprising an opening configured to receive the second optical window, and wherein the compact material analyzer device further comprises: a printed circuit board comprising a hole aligned with the first optical window, the metal substrate being attached to a first surface of the printed circuit board, the light source being attached to a second surface of the printed circuit board.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-29C may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-29C may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A compact material analyzer device, comprising:
   a light source configured to generate input light;
   a module comprising a first optical window on a first side of the module, a second optical window on a second side of the module opposite the first side and a light modulator, the light modulator configured to receive the input light from the light source through the first optical window, attenuate the input light, and produce modulated light based on the input light, the light modulator being further configured to direct the modulated light through the second optical window to a sample; and
   a detector configured to receive output light from the sample produced from interaction with the modulated light through the second optical window and to detect a spectrum of the output light.

2. The compact material analyzer device of claim 1, wherein the module comprises a first substrate including a first surface and a second surface, the light modulator being positioned on the first surface of the first substrate.

3. The compact material analyzer device of claim 2, further comprising:
a printed circuit board having the module positioned on a top surface thereof and comprising a hole configured to couple light from the light source into the module.

4. The compact material analyzer device of claim 3, wherein the first substrate comprises an interposer, the first substrate being attached to the printed circuit board.

5. The compact material analyzer device of claim 2, wherein the first optical window is positioned on the second surface of the first substrate.

6. The compact material analyzer device of claim 5, wherein the light source is positioned on the second surface of the first substrate, and wherein the module further comprises:
a first reflector; and
a second reflector, the first reflector configured to receive the input light from the light source and to direct the input light through the first optical window to the second reflector, the second reflector configured to direct the input light to the light modulator.

7. The compact material analyzer device of claim 6, wherein the module further comprises:
a third optical window;
an additional light modulator;
a third reflector; and
a fourth reflector,
wherein the third reflector is configured to receive the input light from the light source and to direct the input light through the third optical window to the fourth reflector, the fourth reflector configured to direct the input light to the additional light modulator the additional light modulator further configured to produce additional modulated light based on the input light and to direct the additional modulated light through the second optical window to the sample to produce additional output light from interaction with the additional modulated light directed to the detector.

8. The compact material analyzer device of claim 2, wherein the first substrate comprises an opening, the first optical window covering the opening.

9. The compact material analyzer device of claim 2, further comprising:
a source module comprising a second substrate and the light source, wherein the light source is positioned on the second substrate.

10. The compact material analyzer device of claim 9, further comprising:
a light detection module comprising a third optical window, a third substrate and the detector, wherein the detector is positioned on the third substrate and configured to receive the output light from the sample through the third optical window.

11. The compact material analyzer device of claim 10, wherein the light detection module further comprises a lens on the third optical window.

12. The compact material analyzer device of claim 2, wherein the detector is positioned on the first surface of the first substrate and is configured to receive the output light from the sample through the second optical window.

13. The compact material analyzer device of claim 1, further comprising:
a reflector positioned adjacent the sample and opposite the second optical window and configured to reflect the output light from the sample back to the sample to direct the output light to the detector.

14. The compact material analyzer device of claim 1, further comprising:
an optical concentrating element configured to collect the output light from the sample and to reflect the output light to the detector.

15. The compact material analyzer device of claim 14, wherein the optical concentrating element is a compound optical concentrating element comprising an inner optical concentrating element having a first depth and an outer optical concentrating element having a second depth less than the first depth, wherein the outer optical concentrating element is configured to reflect the output light back to the sample to produce additional output light collected by the inner optical concentrating element for reflection to the detector.

16. The compact material analyzer device of claim 15, wherein the outer optical concentrating element comprises a ring shape.

17. The compact material analyzer device of claim 14, wherein the detector comprises a first detector and a second detector and the optical concentrating element comprises a first optical concentrating element configured to direct a first portion of the output light to the first detector and a second optical concentrating element configured to direct a second portion the output light to the second detector.

18. The compact material analyzer device of claim 17, wherein the first portion of the output light is received from a first spatial location on the sample and the second portion of the output light is received from a second spatial location on the sample.

19. The compact material analyzer of claim 17, wherein the first portion of the output light comprises a first wavelength range and the second portion of the output light comprises a second wavelength range different than the first wavelength range.

20. The compact material analyzer device of claim 1, wherein the module further comprises:
a first optical element configured to receive the input light and to direct the input light to the light modulator; and
a second optical element configured to receive the modulated light and to direct the modulated light through the second optical window to the sample.

21. The compact material analyzer of claim 20, wherein the module further comprises a third optical element positioned on or formed within the second optical window and configured to direct the modulated light from the second optical element to the sample.

22. The compact material analyzer device of claim 20, further comprising:
a light coupling device comprising the first optical element, the second optical element, and an optical concentrating element configured to collect the output light from the sample and to reflect the output light to the detector, wherein the light coupling device is formed of a single piece of material.

23. The compact material analyzer device of claim 22, wherein the light coupling device comprises at least one mechanical alignment feature configured to optically align the light coupling device with the light modulator.

24. The compact material analyzer device of claim 22, wherein the light coupling device comprises an electromagnetic shielding wall configured to prevent direct electromagnetic coupling between the detector and the light modulator.

25. The compact material analyzer device of claim 1, wherein the module further comprises an additional light modulator configured to receive the input light from the light source, the additional light modulator further configured to produce additional modulated light based on the input light and to direct the additional modulated light through the second optical window to the sample to produce additional output light from interaction with the additional modulated light directed to the detector.

26. The compact material analyzer device of claim 25, wherein the module further comprises a third optical window on the first side of the module and the additional light modulator is configured to receive the input light from the light source via the third optical window.

27. The compact material analyzer device of claim 1, wherein the light modulator comprises a Mach Zehnder interferometer configured to produce the modulated light and additional modulated light, each directed to a different spatial location on the sample, and further comprising:
an additional detector configured to receive additional output light from the sample produced from interaction with the additional modulated light and to detect an additional spectrum of the additional output light.

28. The compact material analyzer device of claim 1, further comprising:
an illumination waveguide configured to guide the modulated light to the sample; and
a collection waveguide configured to guide the output light to the detector.

29. The compact material analyzer device of claim 28, wherein the illumination waveguide comprises a curved waveguide interface.

30. The compact material analyzer device of claim 28, wherein:
the second optical window comprises a lens configured to couple the output light to the collection waveguide;
the light modulator is formed in a substrate comprising a device layer, an oxide layer, and a handle layer, and
the collection waveguide comprises a first collection waveguide formed in the device layer and a second collection waveguide formed in the handle layer, the first collection waveguide and the second collection waveguide being parallel.

31. The compact material analyzer device of claim 1, wherein the module comprises a frame, the frame comprising respective features configured to facilitate insertion and alignment of the light modulator and the detector, the frame further comprising a first opening configured to facilitate insertion of the second optical window, a protruded alignment part extending from a side of the frame, and a plurality of alignment pins, and wherein the material analyzer device further comprises:
a printed circuit board comprising a second opening configured to receive the protruded alignment part, a plurality of alignment holes configured to receive the plurality of alignment pins, and a hole aligned with the second optical window.

32. The compact material analyzer device of claim 31, wherein the light source is integrated on a backside of the printed circuit board.

33. The compact material analyzer device of claim 1, wherein the module comprises:
a metal substrate comprising alignment features configured to align the light modulator, the detector, and the first optical window on the metal substrate; and
a frame attached to the metal substrate and comprising an opening configured to receive the second optical window, and wherein the compact material analyzer device further comprises: a printed circuit board comprising a hole aligned with the first optical window, the metal substrate being attached to a first surface of the printed circuit board, the light source being attached to a second surface of the printed circuit board.

* * * * *